Figure 1:
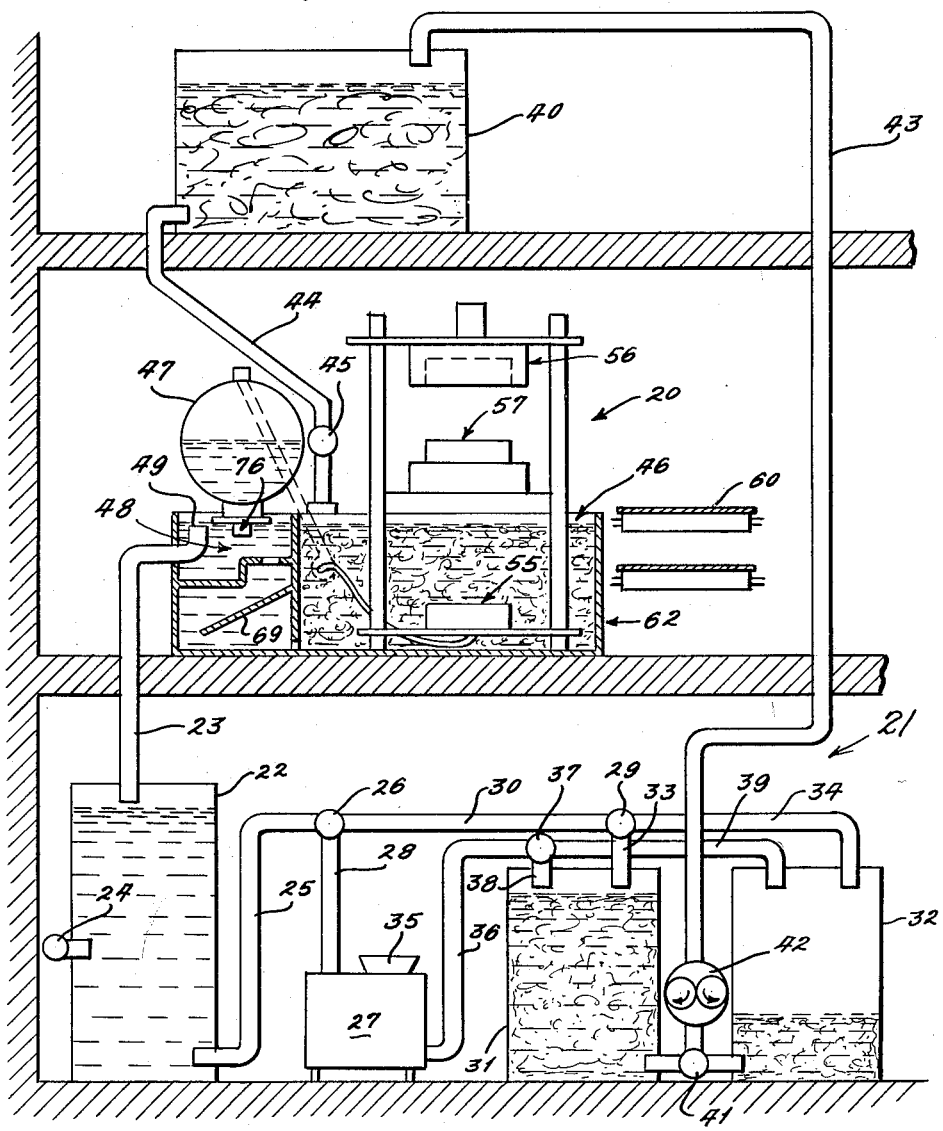

Sept. 1, 1964     F. G. PELLEGRINO ETAL     3,147,180
AUTOMATIC MOLDING APPARATUS FOR FORMING PULP ARTICLES
Filed Dec. 23, 1960     12 Sheets-Sheet 5

INVENTORS:
FRANK G. PELLEGRINO
DONALD J. TAYLOR
VINCENT BERARDINO
BY Gravely, Lieder & Woodruff
ATTORNEYS, Sept. 1, 1964    F. G. PELLEGRINO ETAL    3,147,180
AUTOMATIC MOLDING APPARATUS FOR FORMING PULP ARTICLES
Filed Dec. 23, 1960    12 Sheets-Sheet 6

INVENTORS:
FRANK G. PELLEGRINO
DONALD J. TAYLOR
VINCENT BERARDINO

BY Gravely, Lieder & Woodruff
ATTORNEYS,

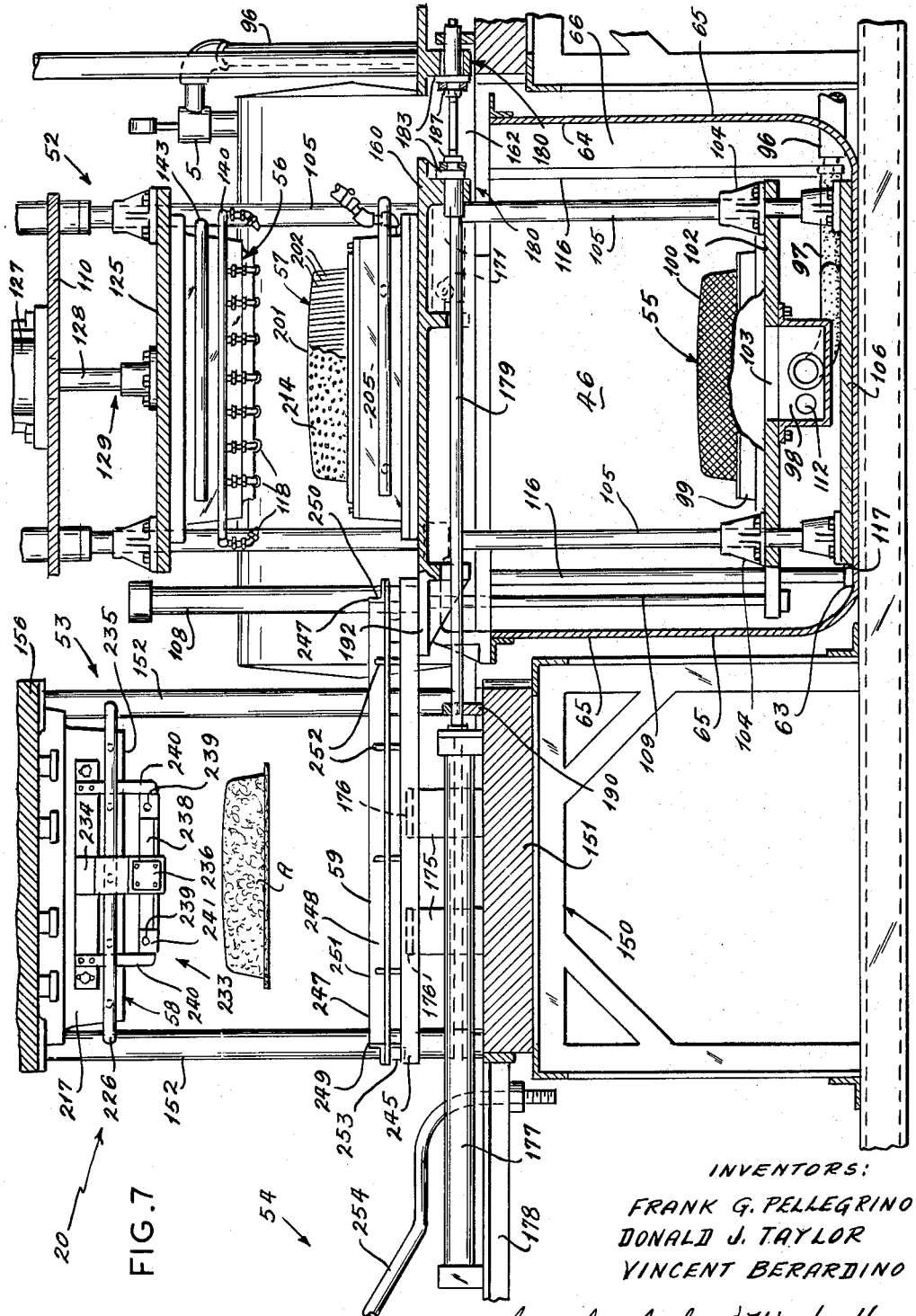

Sept. 1, 1964     F. G. PELLEGRINO ETAL     3,147,180
AUTOMATIC MOLDING APPARATUS FOR FORMING PULP ARTICLES
Filed Dec. 23, 1960     12 Sheets-Sheet 8
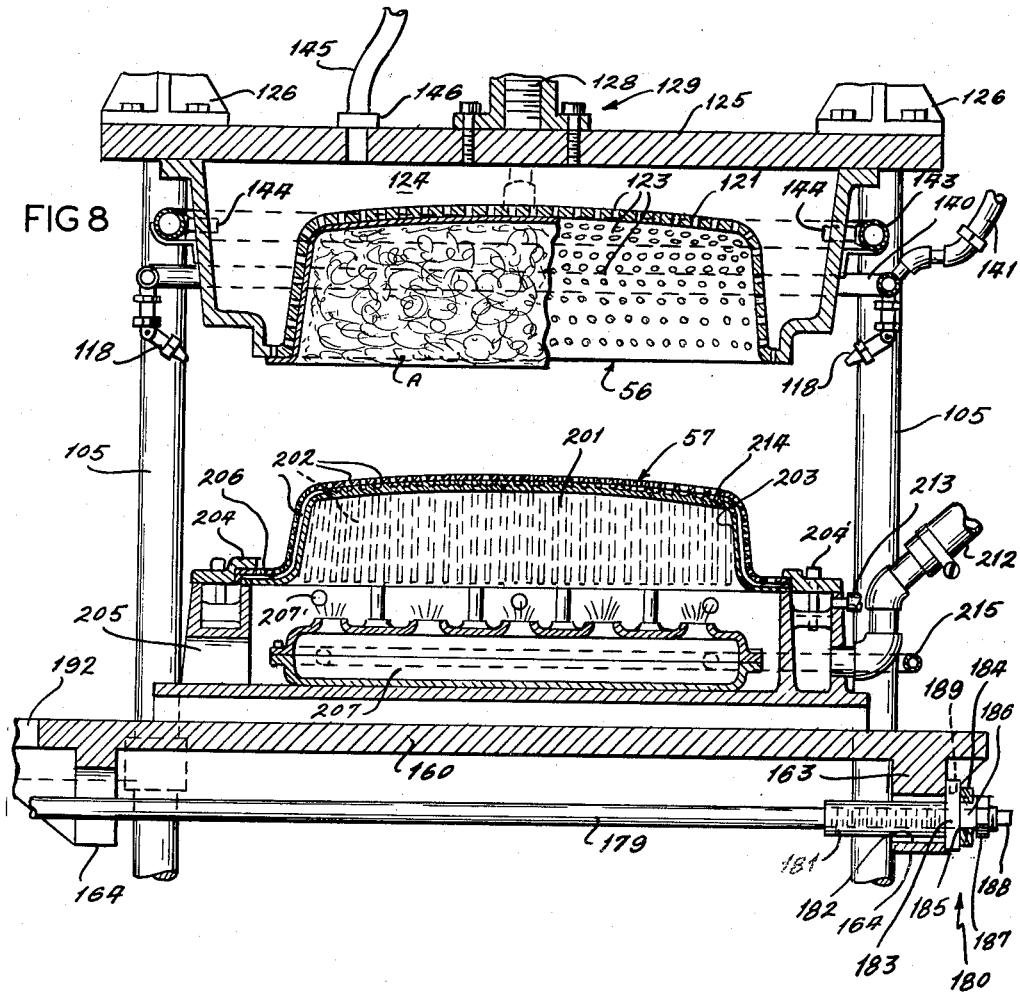
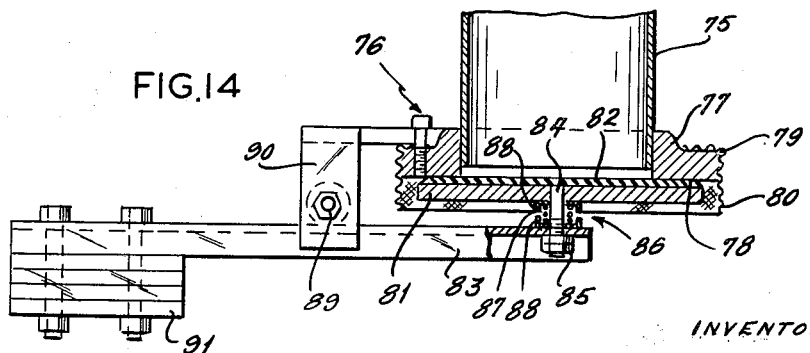
INVENTORS:
FRANK G. PELLEGRINO
DONALD J. TAYLOR
VINCENT BERARDINO
BY Gravely, Lieder & Woodruff
ATTORNEYS.

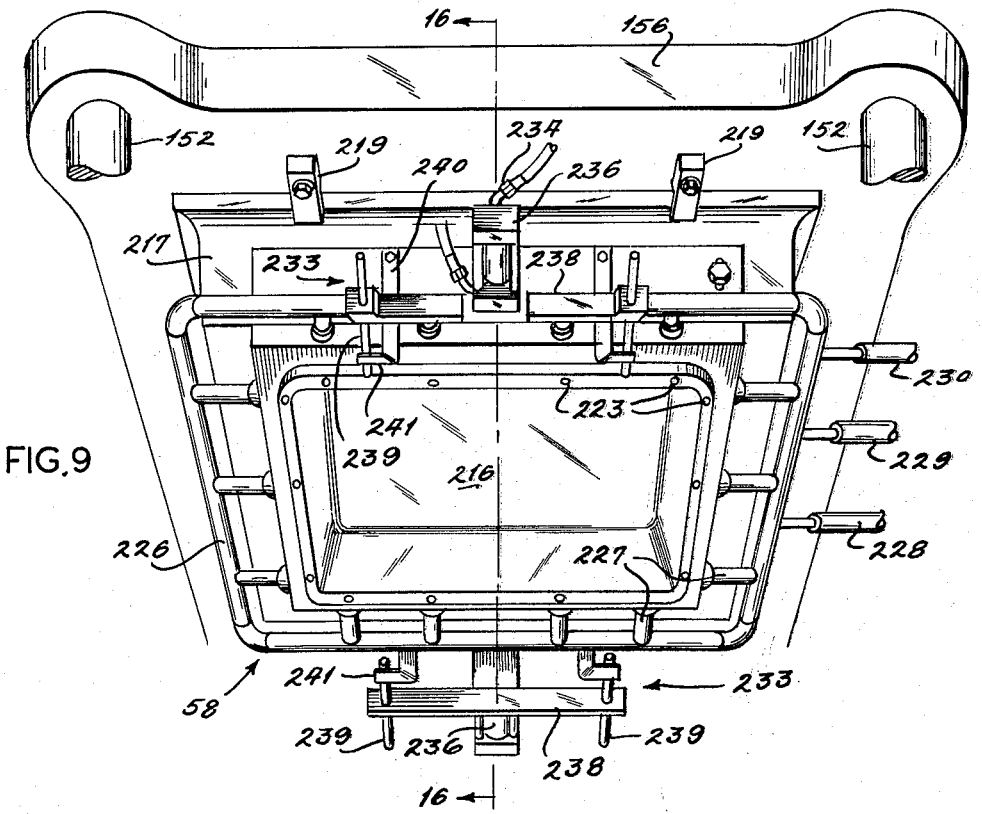
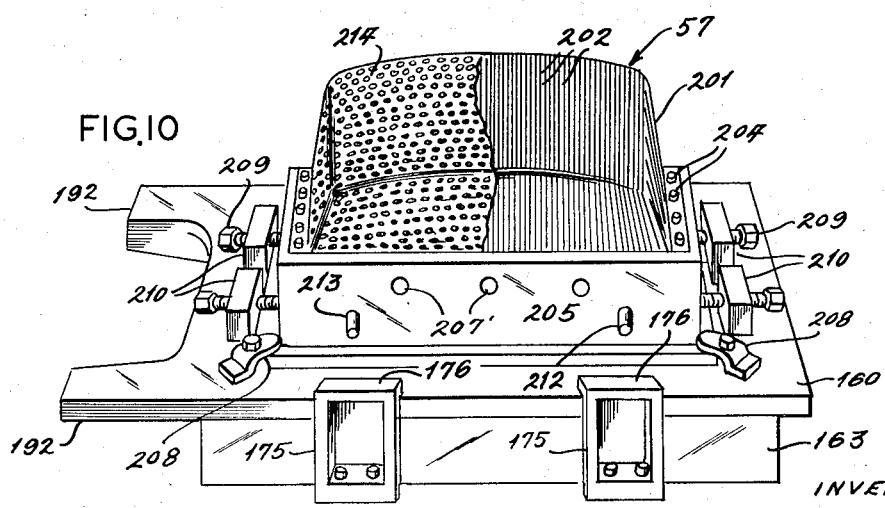

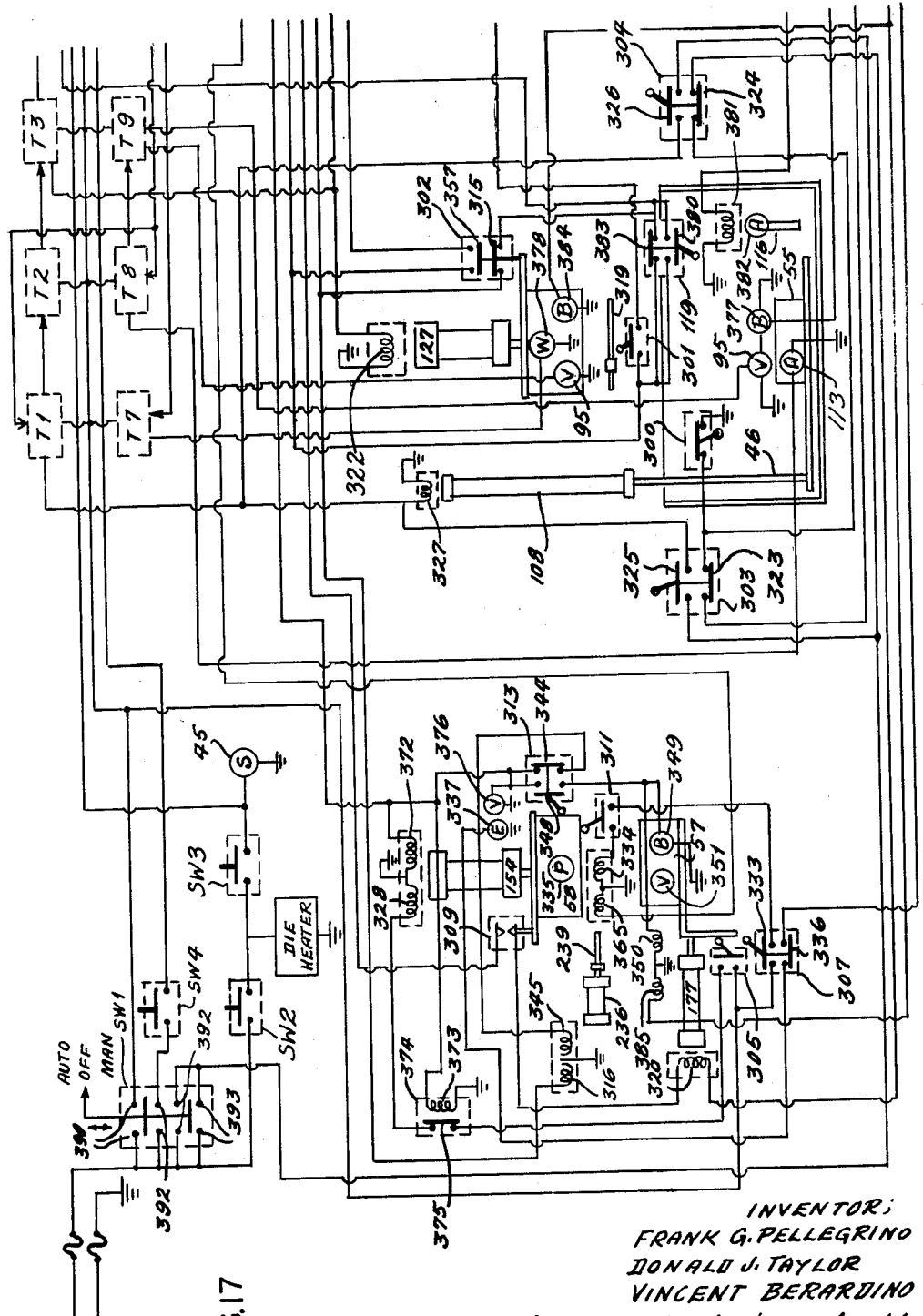

3,147,180
AUTOMATIC MOLDING APPARATUS FOR
FORMING PULP ARTICLES
Frank G. Pellegrino, Clayton, Donald J. Taylor, Valley
Park, and Vincent Berardino, Normandy, Mo., assignors to General Fibre Company, St. Louis, Mo., a corporation of Missouri
Filed Dec. 23, 1960, Ser. No. 78,017
19 Claims. (Cl. 162—389)

This invention relates generally to pulp molding apparatus and more particularly to systems and mechanisms for automatically making molded pulp articles and the like. The invention also relates to improvements in methods of making pulp articles.

Heretofore many mechanisms and methods have been proposed for producing molded pulp articles. According to prior processes of suction molding pulp articles from an aqueous slurry of pulp fibers, also referred to herein as the accretion or felting process of forming fibrous products, a mass of fibrous material is collected around a mold from a fibrous slurry to form a preform or wet article. The preformed article is then manually placed between shaped drying dies or carried on a shaped drying form through a suitable oven from which it is removed and stacked for further processing. It has also been attempted to use a rotary carrier having a plurality of forming dies moving successively through a fibrous slurry and forming thereon preformed articles. These articles are removed by transfer means, usually of a rotary type also, and transferred to a dryer. The first-mentioned process requires a large amount of equipment occupying excessive floor space and producing articles slowly and under hazardous conditions because of the large amount of manual handling required. The latter mentioned rotary type process is suitable for simple, small, low-cost molded pulp products, such as egg cartons, which may be produced at relatively high speeds. However, none of the prior art methods or apparatus has been satisfactory for relatively close tolerance articles desired to be produced in large quantities and, therefore, by a continuous automatic process.

The principal object of the present invention is to provide a method, and apparatus for carrying out the method, of successively molding fibrous pulp articles in an efficient operation overcoming objectionable features of the prior art.

Another object is to provide advancements in the art of molding fibrous articles in order to effect economies in production as well as safe, fast and efficient manufacture of such articles.

These and still other objects and advantages will become more apparent hereinafter.

The present method includes the steps or operations of maintaining a substantially uniform dispersion and concentration of fibers in solution, molding a preform or article, drying the article, and ejecting the article in a stabilized condition to transfer means for a subsequent processing station, and performing all of the steps in a continuous, automatic operation.

A system and apparatus for carrying out the present method includes means for continuously providing pulp slurry for forming articles, felting means for successively forming and transferring the preformed articles, and drying means adapted to be alternately operable with similar drying means to receive and dry the preformed articles and discharge the articles for subsequent processing, the apparatus including cooperable means for automatically actuating each of said article processing means in preselected timed sequence and providing safety features to prevent jams and assure continuous operation.

The invention also consists in the parts and in the combinations and arrangements of parts hereinafter described and claimed.

Figure 2:
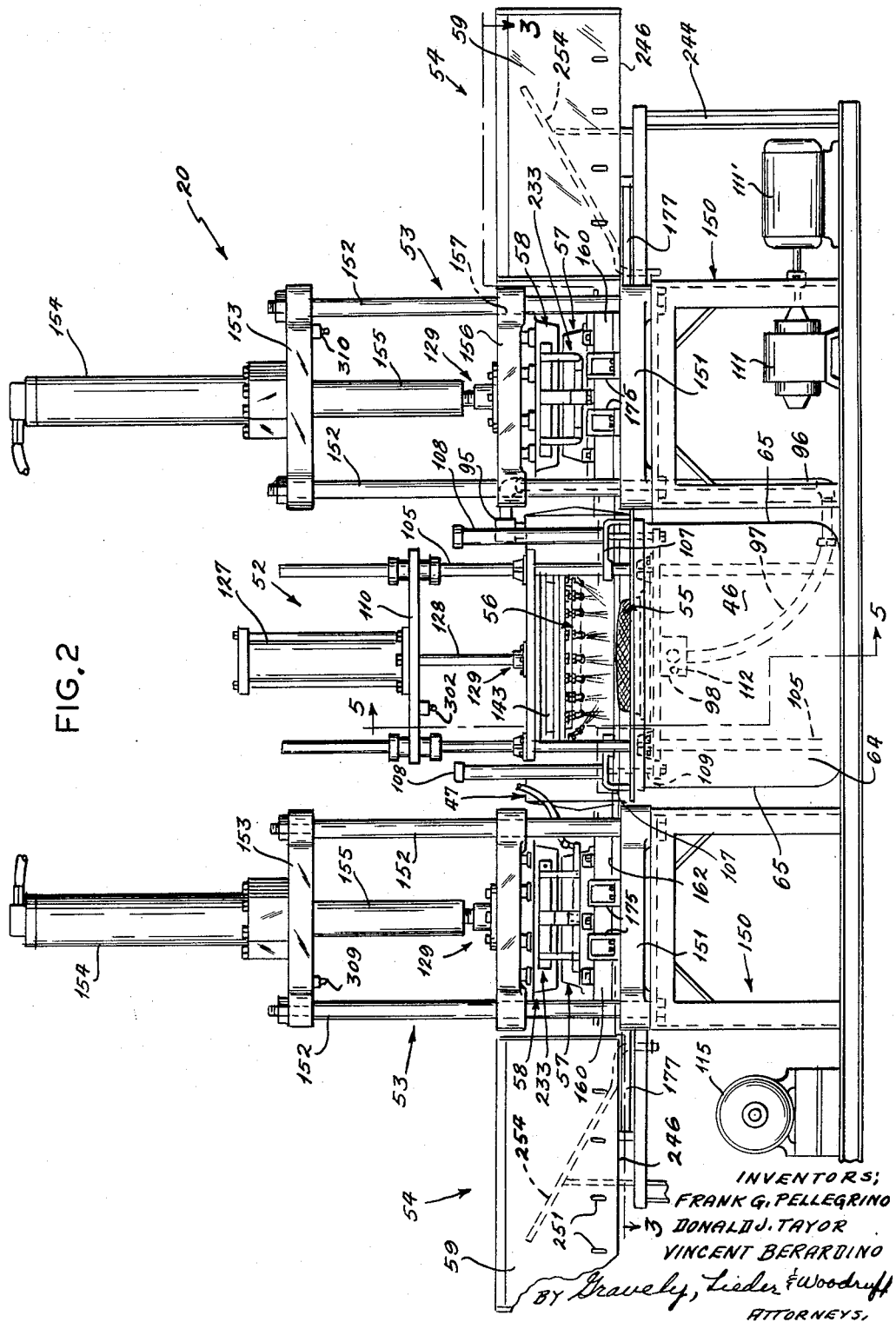
Figure 3:
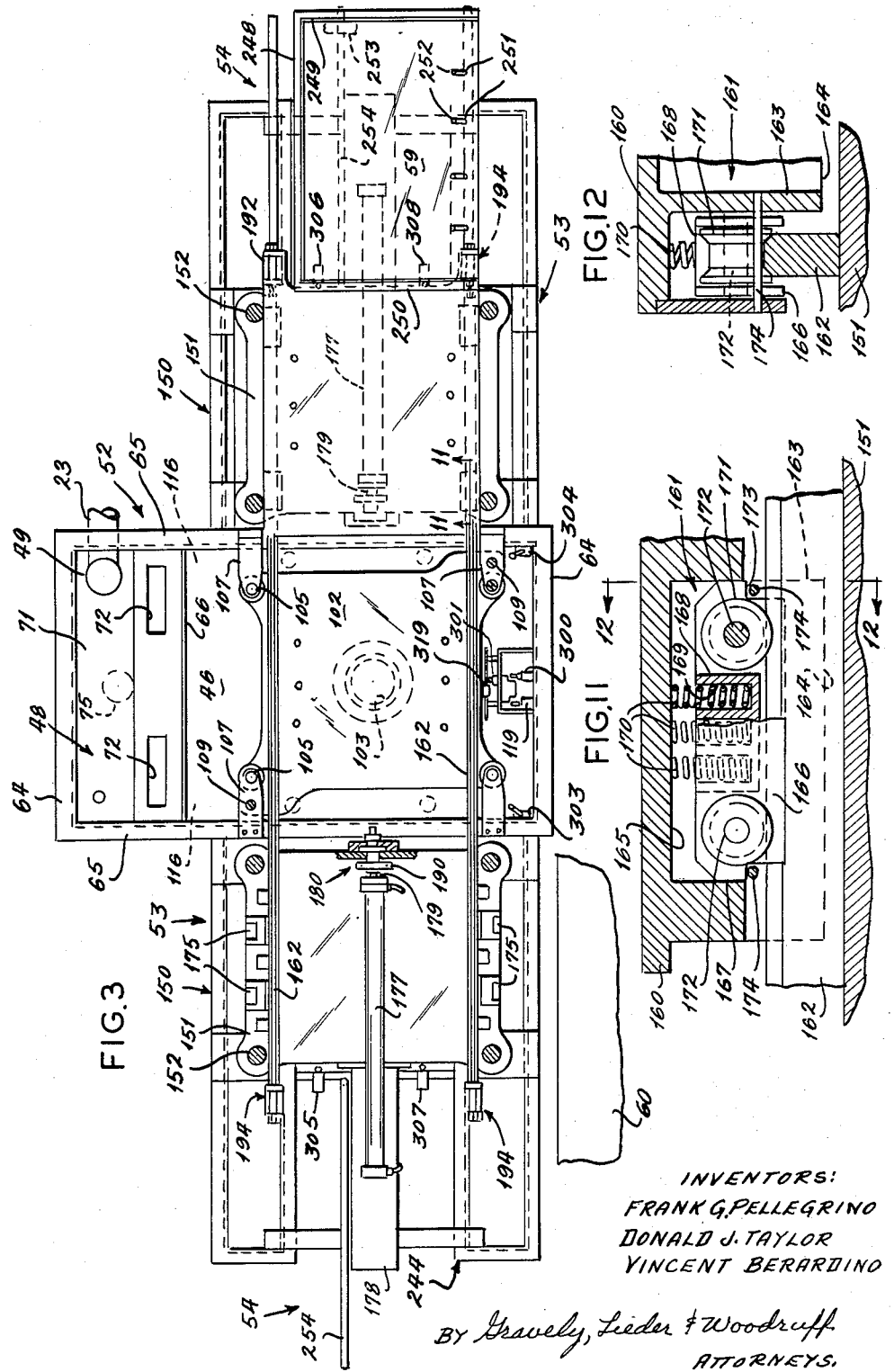
Figure 4:
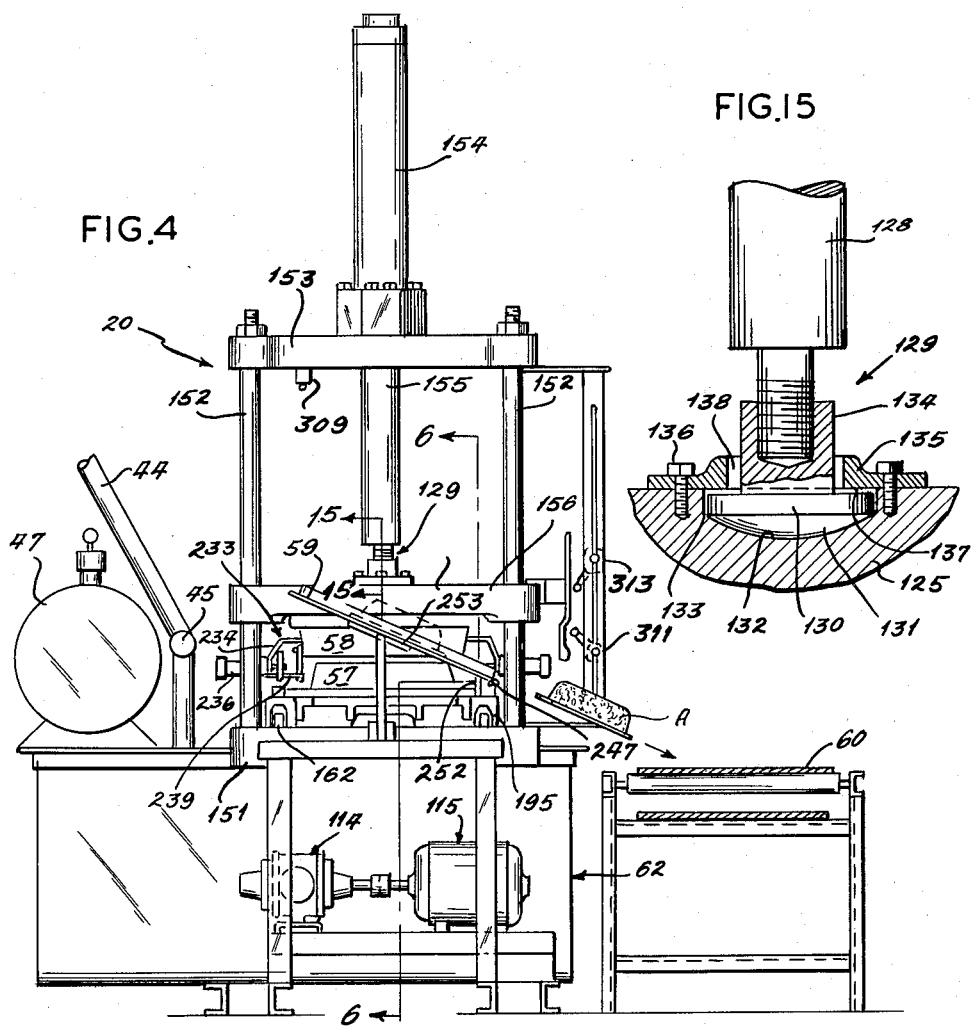
Figure 5:
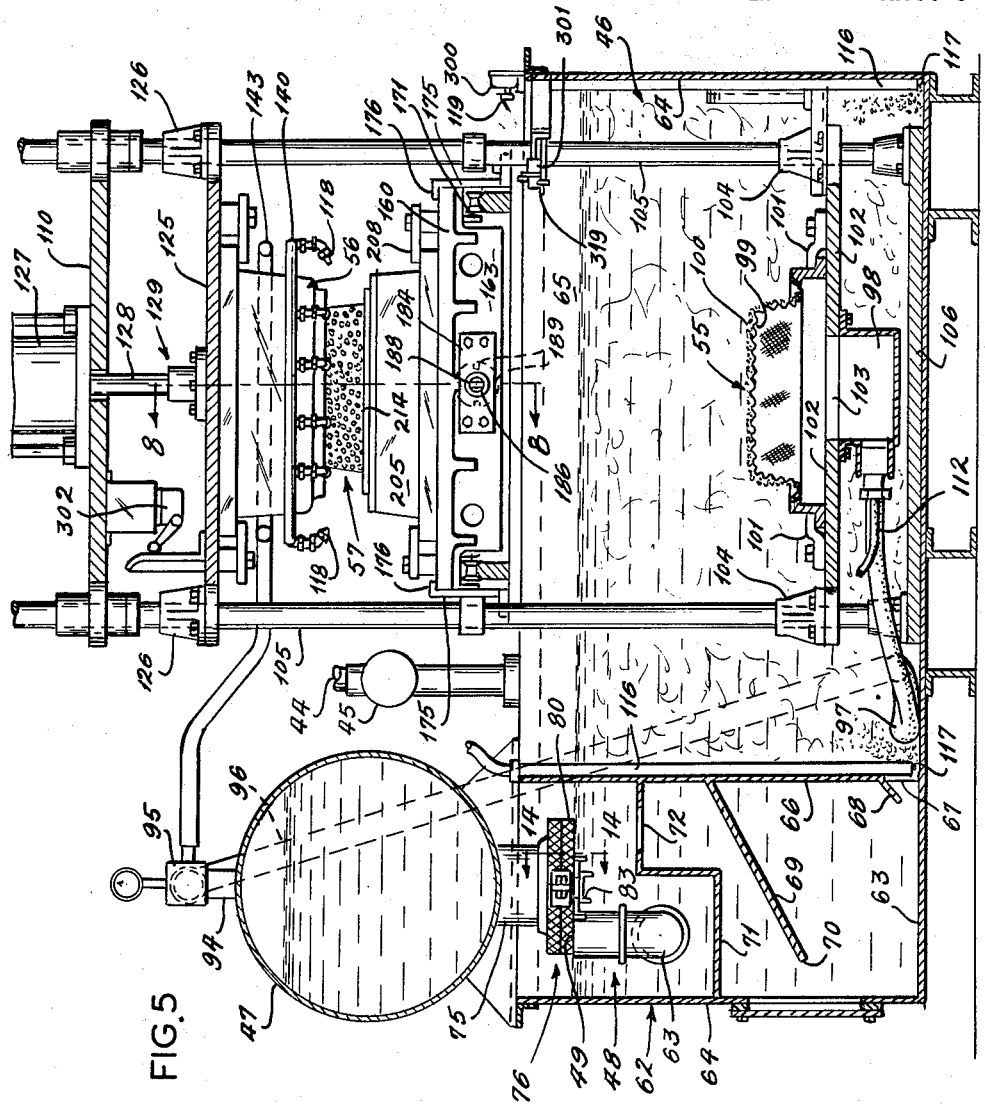
Figure 6:
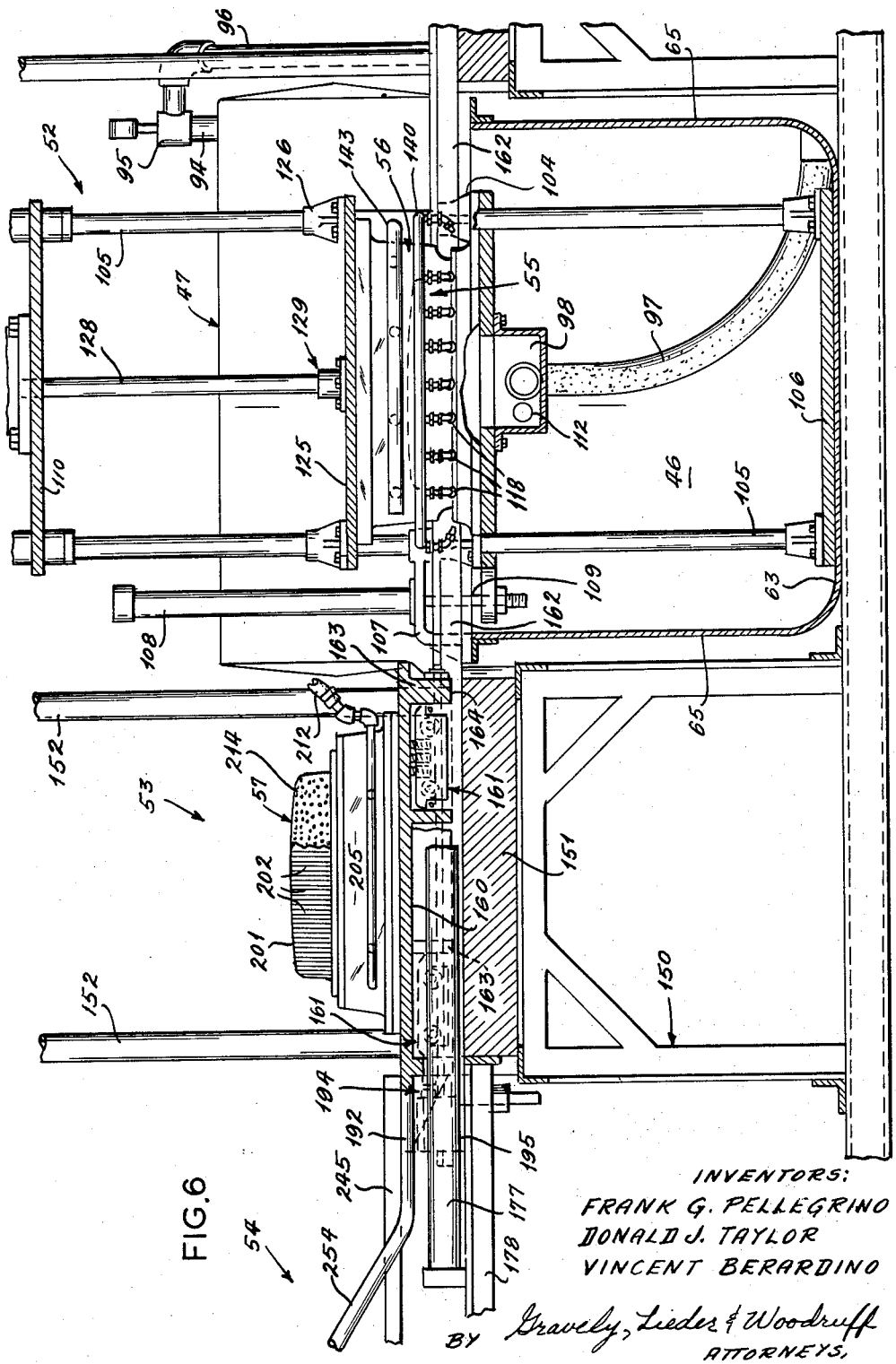
Figure 16:
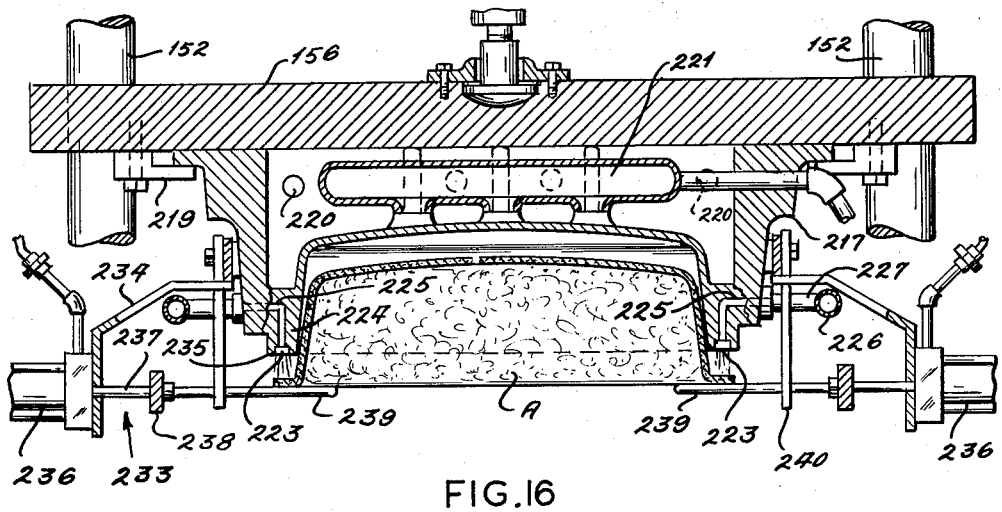
Figure 17:
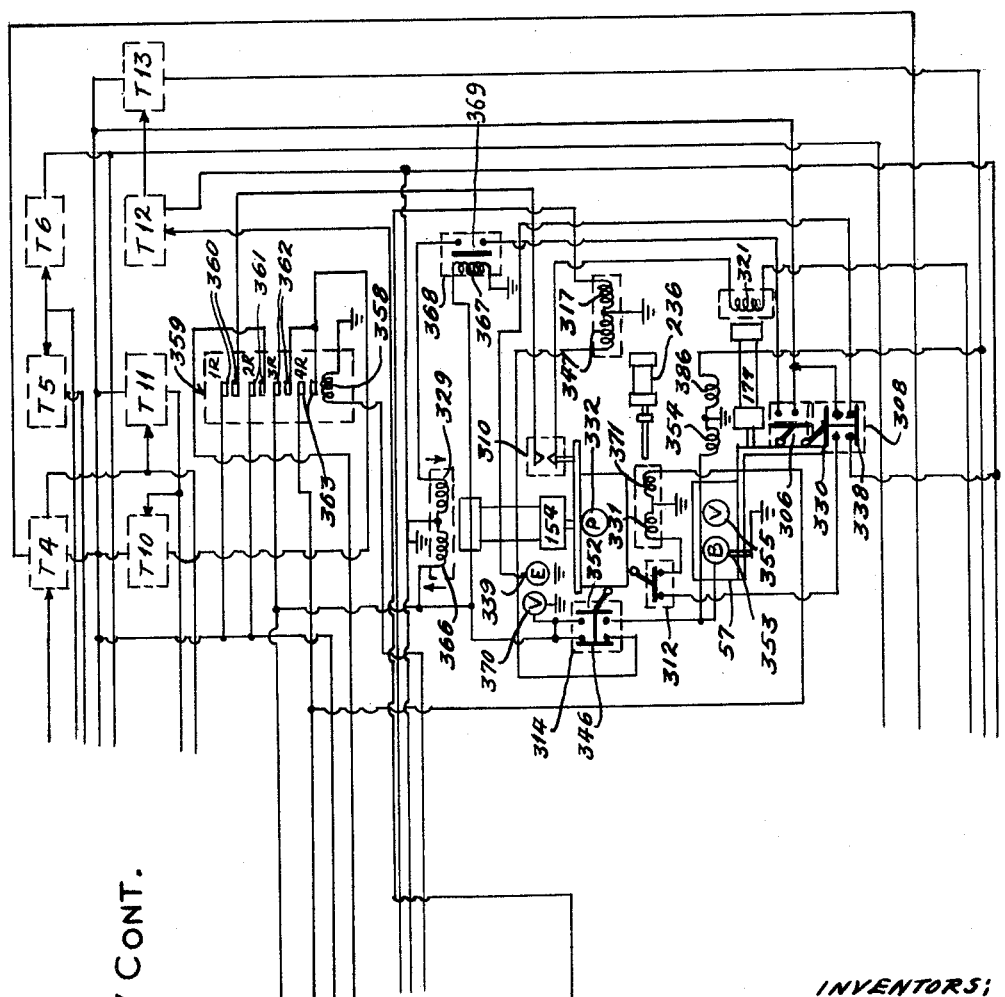

In the accompanying drawings which form a part of this specification and wherein like numerals refer to like parts wherever they occur:

FIG. 1 is a diagrammatic view of a fibrous pulp handling and molding system and apparatus embodying the invention, FIG. 2 is a vertical elevational view showing the front side of a pulp molding machine embodying the invention and showing one stage of apparatus operation, FIG. 3 is a horizontal view, partly in section, taken substantially along line 3—3 of FIG. 2, FIG. 4 is a vertical end elevational view of the molding apparatus, FIG. 5 is an enlarged vertical cross-sectional view taken substantially along line 5—5 of FIG. 2, but showing a different stage of apparatus operation, FIG. 6 is an enlarged vertical cross-sectional view taken substantially along line 6—6 of FIG. 4 and showing a stage of the apparatus operation, FIG. 7 is a view similar to FIG. 6, but showing another operational step of the apparatus, FIG. 8 is an enlarged vertical cross-sectional view taken substantially along line 8—8 of FIG. 5, and showing the male drying and transfer dies in adjacent position, FIG. 9 is a perspective view, partly broken away, showing the female drying die, FIG. 10 is a perspective view, partly broken away, showing the male drying die, and being arranged in exploded relationship with the FIG. 9 view of the female die with which it is cooperable, FIG. 11 is a greatly enlarged fragmentary cross-sectional view of a carrier device as taken along line 11—11 of FIG. 3, FIG. 12 is a sectional view taken along line 12—12 of FIG. 11, FIG. 13 is a sectional view of a carriage stop member, FIG. 14 is an enlarged elevational view, partly in section, of a valve mechanism as taken substantially along line 14—14 of FIG. 5, FIG. 15 is an elevational view, partly in section, showing a connecting device, FIG. 16 is a cross-sectional view of the female drying die as taken substantially along line 16—16 of FIG. 9, and FIG. 17 is a schematic diagram of control means for operating the apparatus.

Referring now to FIG. 1 of the drawings wherein the present system and apparatus are represented diagrammatically, it will be seen that an automatic molding apparatus 20 for successively molding pulp articles in a continuous operation is arranged in a system 21 for supplying an aqueous suspension of pulp fibers to the apparatus 20 are required. The system 21 includes a reservoir 22 of liquid, such as water which may be recirculated from the apparatus 20 through return line 23, as will appear. The water may be treated in the tank 22 to form the desired liquid body in which fibrous material is to be suspended. Fresh water may also be added to the reservoir 22 by operating a suitable valve 24 if the liquid in the reservoir falls below a predetermined level.

The reservoir 22 is connected by a feed line 25 to a valve 26, preferably operated by a timer (not shown) for distributing predetermined amounts of the aqueous solution to a beater or mixer unit 27 through a conduit 28 and to another valve 29 through conduit 30. The valve 29 is operated to selectively supply the aqueous solution to one of two stock chests 31 and 32 through lines 33 and 34. The mixer 27 is adapted to mix a concentrated slurry of pulp suspension by the addition of fibrous material through a hopper 35 or by suitable supply means therefor, and deliver the concentrated slurry through a supply line 36 to a valve 37 having connections to lines 38 and 39 to the stock chests 31 and 32, respectively. The stock chests 31 and 32 are maintained in filled condition to form secondary reservoirs from which the fibrous slurry is supplied to a primary pulp reservoir 40, and each of the stock chests is adapted to receive two or more batches of concentrated slurry from the mixer 27 to which is added a proportion of aqueous solution direct from the reservoir 22 through the valves 26 and 29 in order to form the desired slurry concentration for the molding operation. The valves 26, 29 and 37 and the mixer operation are responsive to control means (not shown) actuated by a filled or unfilled condition of the stock chests 31 and 32 to assure the constant supply of pulp slurry.

The stock chests 31 and 32 have outlets connected through a valve 41 and pump 42 to a conduit 43 for supplying the pulp suspension to the primary reservoir 40. Suitable control means (not shown) are provided for the valve 41 to alternately connect the stock chests with the conduit 43, and for activating the pump 42 when the primary reservoir slurry drops below a predetermined level. The reservoirs 31, 32 and 40 are provided with suitable mechanical or like means (not shown) for agitating the slurry therein to maintain a substantially uniform dispersion of fibrous material in the aqueous solution. The primary reservoir 40 has an outlet connected by a feed line 44 through a valve 45 to a preform or slurry tank 46 of the apparatus 20 for gravity feeding thereof. The apparatus 20 also includes a header tank or reservoir 47 and a reservoir or surge tank portion 48, the latter having a spill-over drain 49 to which the return line 23 to the clear water return reservoir 22 of the supply system 21 is connected.

For purposes of illustration, the system 21 is shown with the pulp mixing and secondary storage facilities, the apparatus 20, and the primary reservoir 40 all located on different floors of a building. However, it is apparent that different pumping and gravity feed arrangements may be utilized to provide for proper pulp mixing and feeding in the operation of the system, which will be described more fully hereinafter.

Referring now to FIGS. 2-16 of the drawings wherein the presently preferred apparatus 20 embodying the invention is shown, it will be seen that the apparatus 20 comprises a plurality of article processing devices including a forming or felting station 52, a drying or pressing station 53 and a discharge station 54. A pair of the drying stations 53 are shown on opposite sides of the forming station 52 although one drying station, or even three or four drying stations 53, may be arranged laterally of the forming station 52 for cooperation therewith if desired. In the event four drying stations were provided, it is apparent that they would be constructed in a cruciform arrangement in accordance with the present invention. Therefore, the construction of each drying station 53 and discharge station 54 being substantially identical, only one will be described hereinafter in detail.

The forming station 52 includes a male forming or felting die 55 for molding a preform or article A from the pulp slurry in the preform tank 46, and a female transfer die 56 substantially complementary to the male die 55 for receiving the preform and transferring it to the drying station 53. The drying station 53 includes a male drying die 57, similar in shape to the forming die 55, movable between an indexed position under the transfer die 56 for receiving the preform and an indexed position aligned with a female drying or molding die 58. The drying dies 57 and 58 are cooperable for drying the article under predetermined conditions of heat and pressure and the female die 58 carries the molded article A for ejection to the discharge station 54. The discharge station 54 as shown comprises a plate 59 movable to an angular position for discharging the molded article A to a continuous conveyor belt 60 or the like for conveying the articles to a subsequent processing station (not shown), such as for trimming, painting or other treatment steps or for packaging the articles. It will be noted that the article A herein shown is a simple shell or container, but it is to be clearly understood that variations in shape can be quite complex and the size of the article can be quite large. The method of forming accreted fibrous articles will be defined hereinafter.

Referring particularly to FIGS. 2, 5, 6, 7 and 8, the forming station 52 has a main tank body 62 including the preform or slurry felting tank portion 46 and the surge tank portion 48, the tank 62 being constructed as a base for the felting station devices. The main tank 62 includes a bottom wall 63 and outer opposed pairs of walls 64 and 65, and the tank portions 46 and 48 are divided by a partition wall 66 having a lower opening 67 adjacent to the bottom wall 63 providing continuous communication therebetween. A baffle 68 extends at a downward angle from above the opening 67 toward the bottom wall 63 into the tank portion 48 and another baffle 69 is also angularly positioned in the tank 48 having a free edge 70 adjacent to the back or end wall 64 of the tank 62. These baffles 68 and 69 dampen agitation of the liquid suspension flowing through the opening 67 between the tank portions 46 and 48 to substantially retain the pulp slurry in the lower portion of the tank portion 48 inasmuch as the volume of the tank portion below the baffle 69 is larger than the volume of slurry displaced from the pulp tank 46 as will appear hereinafter. The tank portion 48 comprises a return or feed means for maintaining the liquid level in the slurry tank 46, and the tank portion 48 is divided by a stepped wall 71 having openings 72 in its upper level to supply liquid from an upper portion of the tank to the lower portion in a manner that the liquid will pass a relatively restricted point between the juncture of the lower wall level and vertical wall member and the baffle 69 as well as the relatively restricted point between the end 70 of the baffle 69 and the end wall 64. The drain 49 is located in the upper portion of the return tank 48 and determines the liquid level in the main tank 62, the drain being connected by return line 23 to the "white water" reservoir 22 of the system 21. Accordingly, it is important to substantially eliminate fibrous material from the upper portion of the return tank 48 except for minute fines inasmuch as water or liquid therefrom is to be returned and utilized in making new slurry mixtures or batches.

The return tank 48 is gravity fed from the header reservoir tank 47 positioned thereabove and in communication through a vertical outlet tube 75 controlled by valve means 76, FIG. 14. The valve means 76 include a collar 77 secured on the lower end of the tube 75 and having a lower annular seal seating surface 78 around the tube opening. A screen 79 or the like circumscribes the collar 77 and forms a lower flange portion 80 to form a splash guard. A seal plate 81 carrying a seal member 82 is normally maintained in sealed position with the annular seat 78 and is yieldably mounted on one end of an inverted channel shaped arm 83. A rod 84 secured to the plate 81 extends through an opening in the arm 83 and has a nut 85 forming a stop. Spring means 86 including a spring 87 and opposed flanged spring retainers 88 bias the seal plate 81 and arm 83 apart and permit limited relative movement between the plate 81 and arm 83. The arm 83 is pivoted, at 89, intermediate its ends on a yoke member 90 secured to the collar 79, and a counterbalance 91 is provided on the outer free end of the arm 83. The counterbalance weight is predetermined to normally maintain the seal 82 seated, and is movable in response to a predetermined head of water recovered in the header reservoir 47 acting on the effective seal surface exposed in the tube opening for releasing a volume of substantially clear water from the reservoir into the upper portion of the return tank 48.

The reservoir 47 has inlet 94 connected through a valve 95 to a pipe 96, which in turn receives one end of a flexible hose 97 connected to a vacuum box 98 of the felting die 55. The header reservoir 47 is under vacuum during the felting operation and receives the aqueous solution from the felting die 55, whereby the vacuum maintains the seal 82 seated until the felting operation is ended as will be described. Referring particularly to FIGS. 3, 5 and 7, the male felting die 55 comprises a rigid perforate frame or mold 99 shaped to the approximate inside contour of the article A desired to be made, the frame 99 being covered with a screen 100 of usual design and mesh to assure the deposit or accretion thereon of substantially all fibrous material in the quantity of pulp slurry utilized in forming an article. The frame 99 is secured by suitable means 101 on a carrier base member 102 and is in communication with the vacuum box 98 through a central opening 103 therein. The carrier base 102 has guide sleeves 104 slidably positioned on vertical slides or posts 105 secured to a bottom plate 106 fixed to the bottom 63 of the main tank 62 and secured to the upper margin of the tank 62 by fixed brackets 107. The upper ends of the posts 105 are also connected by a brace member 110.

The carrier base 102 is adapted for vertical movement between a lower felting position and an upper pre-squeeze or transfer position by fluid cylinders 108 having piston rods 109 secured to diagonal corners of the carrier base 102. In addition to the connection of the vacuum box 98 through the valve 95 to the reservoir 47, the interior cavity of the felting die 55 is adapted to be connected by a hose 112 through a valve 113 to a source of compressed air. It will be understood that a suitable air compressor unit 111 driven by motor 111' and a vacuum pump 114 driven by a motor 114', FIGS. 2 and 4, may provide vacuum tank and compressed air accumulator requirements and the operation of the several mechanisms of the apparatus 20.

The header reservoir 47 is connected to the vacuum manifold to provide suction in the vacuum box 98 for drawing the aqueous solution through the felting die 55 when in the felting position, shown in FIGS. 5 and 7, for depositing the fibrous material on the die to form a preform. Thickness of the fiber deposit can be varied, if desired, by providing different mesh screen 100 although a substantially uniform thickness will usually be desired. The thickness and weight of the preform will be controlled by the length of time that a vacuum is drawn through the preform die 55 while in the slurry tank 46 so that equally timed operation for successive molding operations is desirable for uniformity of articles A.

At the end of the felting operation the hoist cylinders 108 are actuated to raise the felting die 55 with the preform thereon to the transfer position above the main tank 62. In the upper position of the die 55 it contacts a switch 119 so that pulp slurry is fed into the slurry tank 46 by actuating the valve 45 from the primary slurry reservoir 40, a timer keeps the valve 45 open for a predetermined period in each cycle of operation of the felting die 55 when it is out of the tank 46. The switch 119 also energizes a timer to provide air agitation of the pulp slurry to obtain a uniform dispersion of pulp fibers. Air tubes 116 are positioned in the slurry tank 46 at the corners or other suitable locations, the tubes 116 extending vertically and having open lower ends 117 adjacent to the tank bottom 63. Compressed air is blown through the tubes 117 by independent timing means substantially simultaneously with the opening of the valve 45 and continues only during the period that the felting die 55 is out of the tank and for a short period after the slurry has been added. The valve means 76 is also acted upon to discharge a volume of liquid into the return tank 48, the excess of which is drained off through the return conduit 23 to the reservoir 22 of the system 21. When the felting die 55 is in its upper transfer position, the vacuum remains on the die to draw air through the preform and remove an amount of residual moisture to provide wet strength to the preform. The female transfer die 56 is then moved into pressing engagement to remove additional moisture. The valve 95 is actuated to transfer the vacuum from the felting die 55 to the transfer die, and substantially simultaneously therewith compressed air is blown into the mold cavity of the felting die 55 to aid in seating the preform in the transfer die 56. This "blow off" ends and the felting die 55 is given a water wash from a plurality of nozzles 118 carried on the transfer die 56. It is desirable to wash or sweep the entire surface of the felting die 55 to remove fines and keep the screen mesh 100 open, but using a minimum of water. A cycle delay timer is provided to assure that the drying station 53 is conditioned for operation before starting another felting cycle, which delay timer times out to actuate the hoist cylinders 108 for lowering the felting die to its felting position and simultaneously actuates timer means for blowing air through the die 55 as it enters the slurry and prevents the vacuum application in the die 55. This air wash of the die further cleans it of fiber fines and the vacuum is applied in the die 55 to form another preform thereon when the vacuum delay and air wash timer times out. The various timing means will be identified further in connection with the operation description hereinafter.

Movement of the die 55 into the pulp slurry displaces a predetermined volume of slurry through the opening 67 into the lower portion of the tank 46 below the baffle 69, which lower tank portion is larger than the volume of slurry displaced. The baffles 68 and 69 dampen the agitation of slurry and substantially retain all slurry in the lower portion whereby the upper tank portion is substantially free of fibrous material as pointed out hereinbefore.

Referring now to FIGS. 2, 5, 7 and 8, the transfer die 56 comprises a rigid female mold 121 having slots or perforations 123 to provide communication over substantially the entire surface area with an interior cavity 124 closed by a carrier base plate 125. The base plate 125 has guide sleeves 126 slidably mounted on the vertical posts 105 for guiding the transfer die 56 in its reciprocating movement between an upper retracted position and a lower transfer position. A cylinder 127 is mounted above the transfer die 56 on the brace 110 and has its piston rod 128 secured to the base plate 125.

As shown in FIG. 15, a limited swivel connection 129 may be provided between the rod 128 and base plate 125, the swivel connection including a head member 130 having a spherical surface 131 retained on a coacting spherical surface 132 formed in a cavity 133 of the base plate 125. The head member 130 has a cylindrical boss 134 threadedly receiving the piston rod 128, and a collar 135 is secured to the base plate 125 by cap screws 136 or the like and forms an abutment surface 137 to retain the head member in the cavity 133. The boss 134 extends through a central opening 138 in the collar 135 and has an annular clearance therewith for permitting relative pivoting movement between the base 125 and rod 128. Although a rigid connection may be used as shown in FIG. 8, it has been discovered that unequal forces sometimes are exerted on the base plate during movement and the swivel connection 129 obviates stress in or breakage of the piston rod 128.

Referring again particularly to FIG. 8, it will be seen that the nozzles 118 are mounted in spaced relation around the transfer die 56 on a supply conduit 140 connected by a feed line 141 to a suitable water pump (not shown) through a timed valve 142. The nozzles 118 are angled inwardly in a pattern for effectively washing the felting die 55 for a predetermined time when the preform has been transferred and the dies 55 and 56 are moving apart toward the felting and remote positions thereof, FIG. 2. The transfer die 56 also includes a vacuum connection such as a peripheral air conduit 143 having a plurality of inlets 144 to the cavity 124, the conduit 143 being connected by a hose 145 to the valve 95, which may be a three-way valve having alternate vacuum connections to both the header reservoir 47 and the die cavity 124 of the transfer die 56. A compressed air connection 146 is also provided to the die cavity 124.

The transfer die 56 is movable from its retracted position to its transfer position by operation of the cylinder 127 and is in juxtaposition with the felting die 55 in a pre-squeeze stage of the cycle of operation to extract a large percentage of residual moisture from the preform. Vacuum is placed on the transfer die 56 and removed from the felting die 55, which is then connected to the compressed air source through the line 112 and valve 113 for a short period to blow the preform into the female mold cavity of the transfer die. The cylinder 127 is then actuated to return the transfer die to retracted position. When the male drying die 57 of one drying station 53 is conditioned to receive a preform for molding, the felting die 55 is returned to its felting position in the slurry tank 46. During the period that another preform is being felted on the die 55, the transfer die 56 is again advanced to its transfer position to position the preform on the male drying die 57, FIGS. 5 and 7. In this operation the vacuum is released from the transfer die 56 when the dies 56 and 57 are seated, and a vacuum is applied in the drying die 57. Compressed air is applied to the cavity 124 of the die 56 through line 146 to assist in transferring the preform to the drying die, and the transfer die is then returned to its retracted position for another complete cycle of operation.

Referring now to FIGS. 2, 3, 6–10, the left drying station 53 will now be described in detail and it will be understood that the right drying station is identical only reversed in its arrangements of parts. The station 53 includes the male drying die 57 movable horizontally between an extended transfer position and a retracted drying position, and the female drying die 58 movable between an upper ejection position and a lower drying position. The drying station also includes a suitable supporting frame 150 having a platen or die supporting bed member 151 of substantial mass. Spaced vertical slides or posts 152 are secured in the platen corners and are connected at the upper ends by a frame brace 153, which supports a hydraulic cylinder 154 having a piston rod 155 for actuating the female drying die 58. The female drying die or ejection die 58 is carried on a base member 156 having corner bores 157 slidably receiving the posts 152, and the piston rod 155 may be secured to the base member 156 by a limited swivel connection 129, as shown in FIG. 15.

The male drying die 57 is carried on a carriage base or drawer 160, which is movably supported by carriage wheel assemblies 161 on spaced parallel tracks or rails 162 secured on the platen 151. It will be noted that the carriage rails 162 extend across the forming station 52 and provide for movement of both left and right male drying dies 57 to an indexed position below the transfer die 56. The rails 162 are also laterally spaced to provide clearance for the felting die 55 and, being secured to the main tank 62 and platens 151 of each drying station 53, strengthen and support the entire apparatus 20. Referring particularly to FIGS. 6, 11 and 12, the carriage base 160 has a plurality of vertical supporting ribs or blocks 163 arranged to contact the platen 151 and form a firm support therewith for the male drying die 57 when drying pressures are applied by the female drying die 58. The lower contact surfaces 164 of the supporting ribs 163 are spaced above the platen 151 a predetermined distance smaller than the vertical clearance permitted by the wheel assemblies 161 as will now be described. Each carriage wheel assembly 161 is mounted in a recess 165 defined by the ribs 163 and has a wheel block having side plates 166 with end margins 167 slidable on the walls of the ribs 163 and a central block 168 with which the plates 166 are preferably formed integral. The block 168 is bored, at 169, to seat springs 170 acting against the underside of the carriage base 160. Wheels 171 are supported on axles 172 journaled in the side plate portions 166, the wheels having a flanged fit with the rails 162. The lower margin of the side plates are notched, at 173, and pins 174 extend between the ribs 163 to form a safety clip and retain the carriage assemblies 161 in the recesses 165. It is apparent that the springs 170 normally urge the carriage base 160 and male drying die 57 upwardly spaced above the wheel blocks of the carriage wheel assemblies 161 so that the die 57 is yieldable and moves easily on the rails 162. However, under pressure the carriage base 160 is forced downwardly and the ribs 163 are seated on the platen 151 to carry the force to the platen and prevent damage to the wheels 171, axles 172 and rails 162. Limit blocks 175, FIGS. 2, 5 and 7, are secured to the bed plate 151 of the frame 150 by suitable means and have lugs 176 on the upper margins extending inwardly in adjacent spaced relation above the upper surface of the carriage base or drawer 160 on opposite sides thereof. The limit blocks permit relative free sliding movement of the male drying die 57, but form a positive stop means to prevent upward travel of the die 57 when a molding operation is completed and the pressure of the female die 58 is removed from the die 57 so that it is unseated from the bed plate 151.

The male drying die 57 is actuated by a cylinder 177 mounted on a frame member 178 and the platen 151 and having its piston rod 179 adjustably connected by a coupling device 180 to the rib 163 of the drawer 160 adjacent to the forming station 52. As shown best in FIGS. 3, 5, 7 and 8, the coupling device 180 comprises a bushing 181 threaded on the end of the piston rod 179 and extending through an opening 182 in the rib 163 with a predetermined clearance. An enlarged head or flange 183 is formed on the bushing 181 and positioned between the end face of the rib 163 and an opposed face of a bracket 184 secured to the rib 163, the bracket having an opening 185 coaxially aligned with the opening 182 in the rib and through which an end sleeve 186 of the bushing 181 extends with a predetermined clearance. A lock nut 187 is threaded on the piston rod 179 against the end sleeve 186 to secure the bushing 181 on the rod, and the free end of the rod 179 is provided with a tool receiving surface 188 for effecting adjustment of the bushing head 183 on the rod 179 and, accordingly, adjustment of the carriage 160 on the rod 179. Preferably tool openings 189, FIG. 5, are provided in the head 183 to hold the bushing 181 against rotation while the rod 179 is turned, but other means for effecting relative rotation may be provided. The full stroke of the piston rod 179 outwardly to carry the male drying die 57 under the transfer die 56 determines the position of the drying die 57, and the coupling device 180 assures a positive adjustment for precisely indexing the die in its transfer position. The clearance between openings 182, 185 and the bushing 181 provide for relative lateral movement of the carriage during the molding operation without bending the piston rod 179, which is slidably mounted in a bearing bracket 190 secured to the bed frame 151 immediately adjacent to the cylinder 177 for support by the bracket 190 of the coupling device 180 in its retracted position.

The ribs 163 are relieved to provide a channel under the carriage 160 for housing the cylinder 177 and piston rod 179. It will be noted that the carriage base 160 has extensions or ears 192 on its remote side from the forming station 52, which ears 192 extend from a rib 163 having a rear face 193 forming an abutment for cooperation with a stop device 194 for indexing the male drying die 57 in its drying position, FIG. 13. The stop device 194 comprises a saddle or U-frame 195 positioned over each rail 162 adjacent to the end thereof and secured thereto by suitable means 196. A cap screw 197 is threaded into the upper block portion 198 of the saddle member 195 and is adjustably set by a lock nut 199. The stop device 194 is set to precisely align the male drying die 57 in its drying position under the female drying die 58, and the carriage 160 is stopped in less than a full return cylinder stroke.

Referring now to FIGS. 6, 7, 8 and 10, the male drying die 57 comprises a mold casting or die body 201 substantially similar in pattern to the external shape of the felting die frame 99, and having slots 202 forming air conduction channels for drawing and ejecting air around the mold 201, as will be described. The interior surface 203 of the mold 201, defining a hollow cavity, is imperforate and the mold is removably secured by a seal ring 204 and fastening means 204' to a housing 205 defining an interior cavity 206 containing burner means 207 and air ports 207' for applying a drying heat of predetermined magnitude to the mold 201. The housing 207 is secured to the carriage base 160 by lugs 208 and screw members 209 are threaded in bosses 210 secured to the base 160 for adjustment in opposed directions. A continuous channel 211 is formed in the housing wall having a connection 212 through valve means to the vacuum source 114, and an air line 213 from the compressor 111 is connected through a valve to the channel 211. The slots 202 in the exterior face of the mold 201 are in communication with the channel 211 for receiving vacuum and compressed air over the surface of the mold, as required. A perforated covering 214 is also provided over the entire mold surface to provide improved molding results. In addition, the burners 207 have a gas manifold 215.

Referring again to FIGS. 2, 4, 7, 9 and 16, the female drying die 58 comprises an imperforate mold casting or die body 216 substantially complementary to the die body pattern (201) of the male drying die 57. The mold 216 is removably secured in a peripheral housing 217 forming a closed chamber 218, the housing 217 being removably secured by lugs 219 to the base member 156. The housing 217 has suitable air openings 220 to the cavity 218 and burner means 221 are provided for applying a direct drying heat of predetermined magnitude on the interior surface of the mold 216. An air system for the female press or drying die 58 comprises a plurality of vertical ports or bores 223 drilled in spaced relation in the flange 224 circumscribing the mold 216 and the ports 223 are connected by cross-drilled ports or bore 225 to form passages around the flange 224. An air manifold 226 is peripherally mounted on the housing 217 and has tubes 227 connected to the passages 223, 225. The manifold 226 is connected by three control lines to means for controlling air in the ports 223. A vacuum line 228 is connected through valving to the vacuum pump 114 for providing a vacuum to lift a dried, molded article A from the male die 57 at the end of a drying cycle of the operation. A low pressure air line 229 is connected through valving and a pressure regulator (not shown) to the air compressor 111 for applying "protection" air in the ports 223 during a molding operation. It will be apparent that a great amount of steam is generated as the hot drying dies 57 and 58 are pressed together under pressure for drying a wet preformed article, and that fines of the accreted pulp article will be blown from the preform at this time. The line 229 supplies air to the ports 223 at a predetermined low pressure to prevent steam and fines from entering and clogging the ports and manifold passages. The third line 230 is connected through a valve and pressure regulator (not shown) to the compressed air source 111 for applying a blast of high pressure air for ejecting the dried articles A from the female mold at a predetermined time in the cycle of operation, all of which will be more fully described hereinafter.

The ejection of articles from the mold 58 is also provided by article stabilizing devices 233 arranged on opposite sides of the drying die 58. Each device 233 includes a bracket 234 secured substantially centrally on the side of the housing 217 and extending outwardly and downwardly below the lower margin 235 of the flange 224. An air cylinder 236 is secured to the bracket 234 and has its piston rod 237 extending through the bracket 234 toward the mold flange margin 235 and carrying a cross-bar 238 on its free end. The cross-bar has substantially parallel spaced fingers 239 extending toward the mold 216 and movable by actuation of the air cylinder 236 between a retracted position and an extended position in which the fingers 239 are positioned inwardly of the flange 224 to receive a molded article ejected from the mold 216. Another support bracket 240 is secured in fixed position on the housing 217 or bracket 234 and has finger supporting tabs or guides 241 to assure rectilinear movement of the fingers 239. It will be readily apparent that stabilizing devices 233 on opposite sides of the mold 216 are actuated simultaneously to move the fingers 239 toward each other under the mold in expanded position. This finger actuation takes place at the end of a molding operation after the vacuum is placed on the ports 223 through the vacuum line 228 and a short blast of compressed air is blown out through the male die 57 to seat the article A in the female mold 216 and the hydraulic cylinder 154 is actuated to open the dies. As soon as the female die 58 clears the male die 57, the cylinder 236 is triggered to move the fingers or pin 239 to expanded position. The fingers remain under the mold 216 until the ejection of the article A from the female mold is performed by the air blast through air line 230, and this ejection is completed by withdrawing the fingers whereby the article A is blown onto the discharge table 59. Accordingly, ejection is triggered by movement of the table 59 to article receiving position under the female die, as will now be described.

Referring to FIGS. 2, 3 and 4, a discharge station 54 is provided for each of the drying stations 53 to discharge the molded article A to a subsequent processing station (not shown), such as by conveyor belt 60. Each discharge station 54 comprises a supporting frame 244 including frame member 178 and arranged laterally from the frame 150 of the adjacent drying station and in the longitudinal direction of article movement from the forming station 52 to the drying station 53. A rigid frame or bar 245 is secured to the carriage base 160 and slidable relative to the frame 244, and the plate or table 59 has its discharge edge 246 hinged, at 247, to the bar 245. The table 59 is swingable on the hinges 247 to an angular or tilted position in which the discharge edge 246 is the low side and whereby articles A will be gravitationally fed from the table to the conveyor belt 60. The table 59 has rear and end marginal rims or rails 248, 249 and 250 to retain the articles thereon when articles are ejected to the table 59, and the front edge has spaced slots 251 through which vertical pins 252 extend in the flat article receiving position of the table 59.

The underside of the table 59 is provided with a wear plate or roller 253 slidable on a camming member 254 secured to the frame member 178 of the supporting frame 244. The camming member 254 extends angularly upwardly and away from the drying station 53. Accordingly, in discharge position the table is cammed upwardly on the camming member 254 and tilts downwardly to its front edge 246, the pins 252 being moved out of the slots 251 so that articles can slide freely from the table 59. The discharge table 59 is moved in concert with the male drying die 57 to its transfer position under the transfer die 56, whereby the table rides downwardly to a horizontal position under the female press 58 for the ejection of articles A onto the table 59.

The complete operation of the entire apparatus 20 will now be more fully described with particular reference to the control circuit for the apparatus 20, as shown in FIG. 17. Referring again to FIGS. 2, 3, 4 and 5, it will be seen that in addition to the switch 119 for the control of pulp slurry feed and air agitation in the slurry tank 46, the apparatus includes switches 300–314. The switch 119 also controls the release of the ejection finger 239, as will be described. The switch 300 is a normally closed limit switch mounted adjacent to the top of the slurry tank 46 to be opened by movement of the felting die 55 to upper transfer position and is in the circuit for energizing solenoids 320 and 321 for the left and right drawer cylinders 177, respectively. The switch 300 is a drawer safety switch to prevent movement of the male drying dies 57 under the transfer die 56 when the preform die 55 is in the upper position.

The impulse switch 301 is a normally open limit switch mounted centrally of the slurry tank 46 and having a rod actuating member 319 in position to be alternately contacted by the left and right drawers or male drying dies 57 for closing a circuit to energize solenoid 322 for the transfer die cylinder 127.

Switches 303 and 304 are safety switches mounted on the left-hand and right-hand sides of the tank 62 in position to be contacted by the left and right drawers 57, respectively. The left switch 303 includes normally closed contacts 323 in the circuit to the solenoid 321 for the right drawer cylinder 177, and similarly the right switch 304 includes normally closed contacts 324 in the circuit to the left drawer cylinder solenoid 320. The left and right drawer safety switches 303 and 304 also have normally open contacts 325 and 326 in parallel circuits to the solenoid 327 for maintaining fluid pressure on the hoist cylinders 108 to keep the preform die 55 in the slurry tank 46.

Switches 305 and 306 are normally open left and right drawer return limit switches mounted on the frames 150 in position to be contacted by cam means when the male drying dies are in indexed drying position. The left switch 305 is in the circuit to the solenoid 328 for actuating the cylinder 154 for moving the left female die 58 downwardly to drying position and the right switch 306 is in the circuit to the solenoid 329 for actuating the right female drying die cylinder 154 to move the right die or press 58 downwardly.

The switches 307 and 308 are also positioned on the drying station frames 150 to be contacted by the left and right drawers 160 to drying position. The switch 308 has normally open contacts 330 in the circuit to energize a solenoid 331 to open the valve 332(P) in the protection air line 229 to the right female drying die 58, and the switch 307 has normally open contacts 333 in a circuit to energize a solenoid 334 to open the valve 335(P) in the protection air line 229 to the left female drying die 58. The left switch 307 also has normally closed contacts 336 in a circuit to operate a valve 337(E) to open the ejection air line 230 to the left female drying die 58, and the right switch has normally closed contacts 338 to open the valve 339(E) in the ejection air line 230 of the right die 58.

Normally open switches 309 and 310 are mounted on the frame of the left and right drying stations 53, respectively, above the female drying dies in position to be contacted and closed when the dies 58 are in the upper ejection position thereof. The switches 309 and 310 are in the circuit to the solenoids 320 and 321 of the left and right drawer cylinders 177, respectively.

Normally open impulse switches 311 and 312 are positioned on supporting frames 342, FIG. 4, in position to be contacted by a cam 34 on left and right female dies 58, respectively, during movement intermediate the upper and lower positions thereof. The switch 311 gives an impulse energizing the solenoid 334 of the protection air valve 335, and the switch 312 energizes the solenoid 331 of the right female die protection air valve 332.

Limit switches 313 and 314 are also mounted on the frames 342 of the left and right drying stations 53, respectively, the cams 343 maintaining the switches 313 and 314 closed during the time the female drying dies 58 are in molding position. The left limit switch 313 has normally closed contacts 344 in a circuit to energize solenoids 345 for actuating the air cylinders 236 to move the ejection fingers 239 for the left press 58 into expanded position, and the right limit switch 314 has normally closed contacts 346 in a circuit to a solenoid 347 for the right press cylinder 236. The left switch 313 also has normally open contacts 348 connected to parallel circuits to a valve 349(B) for introducing blow-off air into the left male drying die 57 and to energize a solenoid 350 for closing a valve 351(V) in the vacuum line to the left male drying die 57. Similarly, the right switch 314 also has normally open contacts 352 connected to parallel circuits to a valve 353(B) for introducing blow-off air into the right male drying die 57 and to energize a solenoid 354 for closing a valve 355(V) in the vacuum line to the right male drying die 57.

The switch 302 is mounted on the transfer die frame in position to be contacted by the transfer die 56 each time it is in retracted or upper position. The transfer switch 302 is the principal control unit for the entire circuit inasmuch as operation of the felting die 55 and left and right drawers 57 is dependent upon the previous transfer of a preformed article to or from the transfer die 56. The transfer switch 302 includes normally closed contacts 315 in a circuit to solenoids 316 and 317 for actuating the air cylinders 236 of the left and right female drying dies 58, respectively, in order to retract the fingers 239 of the respective ejection devices. The transfer switch 302 also includes normally open contacts 357 connected in a circuit to a solenoid 358 of a stepping relay 359, which performs the control task previously set out.

The stepping relay 359, per se, forms no part of the invention and is of the type having sets of contacts 360, 361, 362 and 363 arranged adjacent to a cam carrying shaft (not shown) adapted to be rotated or stepped a portion of a turn by a ratchet mechanism (not shown) when actuated by energizing the solenoid 358. The relay contacts 360 are in the circuit to the solenoid 321 for the right drawer cylinder 177, and the relay contacts 361 are in the circuit to the solenoid 320 for the left drawer cylinder 177. The relay contacts 362 are in a circuit to a solenoid 365 for shutting off valve 335 to interrupt the flow of protection air through air line 229 to the left female drying die 58. The contacts 362 form part of a circuit to a solenoid 366 for the right press cylinder 154 for raising the right press 58, and are also in a circuit to a solenoid 367 of a relay 368 having normally closed contacts 369 in the circuit to the solenoid 329 for actuating the cylinder 154 to send the right press down. A circuit is also provided through the contacts 362 to a valve 370 for establishing a vacuum through the vacuum line 228 to the right female drying die 58. The relay contacts 363 are in a circuit to a solenoid 371 for actuating the valve 332 to shut off protection air through the air line 229 to the right female drying die 58. The contacts 363 also form part of a circuit to a solenoid 372 for actuating the cylinder 154 to return the left female drying die 58 to its upper ejection position, and the relay contacts 363 are in a circuit to a solenoid 373 of a relay 374 having normally closed contacts in the circuit to the solenoid 328 for actuating the left press cylinder 154 to position the left female drying die 58 in molding position. A circuit is also formed through the relay contacts 363 to a valve 376 for establishing a vacuum through the line 228 to the ports 223 of the female drying die 58.

A plurality of timers are provided in the control circuit for the apparatus 20 including hoist timer T1 for providing a circuit to the solenoid 327 for actuating the felting die cylinder 108 to lower the felting die 55 to the preform tank 46 for the timed period of hoist timer T1. In other words, hoist timer T1 controls the length of time the preform die 55 is in the slurry tank 46. A transfer delay timer T2 is triggered when timer T1 times out to provide a delay period during which the preform mold 55 is out of the pulp tank and drawing air through the preform to remove residual moisture and increase the wet strength of the preform. Timer T2 times out to start transfer timer T3 having a circuit to the solenoid 322 for actuating the cylinder 127 to lower the transfer die 56 to its transfer position. Although it appears that ejection air solenoids 337 and 339 are in a circuit from the timer T3, these solenoids are only actuated from timer T12, as will appear.

When the transfer timer T3 times out, the transfer die 56 is returned to its upper position by a spring return on the cylinder 127, and the timer T4 is simultaneously started to actuate an air felt blow off valve 377 in the compressed air line 112 to provide a short blast of air to the felting die 55 when the preform is being transferred to the female transfer die 56. The timer T4 times out and simultaneously starts a cycle delay timer T11 and a water wash timer T7. The water wash timer actuates a valve 378 to spray rinse the preform die 55 by jets of water through the nozzles 118 for the period that the timer T7 runs.

The cycle delay timer T11 provides a delay period during which the transfer die 56 remains in its upper position and the felting die 55 also remains in its upper position out of the slurry tank 46 until one of the female press dies 58 is opened at the end of the cycle delay timer T11 time period. When the timer T11 times out, it resets the time cycle and simultaneously starts the hoist timer T1 and timers T8 and T10.

The timer T8 is a vacuum delay and air wash timer for preventing the vacuum valve 95 from switching the vacuum to the felting die 55 and simultaneously actuating the air wash valve 113 for blowing compressed air through the line 112 and outwardly through the felting die 55. When the vacuum delay timer T8 times out it starts a vacuum timer T9 for actuating the valve 95 to place vacuum on the felting die and mold a preform thereon. The hoist timer T1 times out before the vacuum timer T9 so that the felting die 55 is raised while vacuum is still being applied to mold a preform, and the vacuum remains on the felting die during the time that transfer timer T3 is running to seat the transfer die and perform a pre-squeeze operation removing additional residual water from the preform and times out just before T3 times out to return the transfer die 56 to its upper position. When the timer T9 is not timing the preform operation the valve 95 is connected by the timer T9 to provide a vacuum on the transfer die 56.

The press control timer T10 is started when cycle delay timer T11 times out and provides parallel circuits to normally open contacts 362 and 363 of the stepping relay 359 and is adapted to alternately open the female press dies and place a lift vacuum thereon.

A pulp timer T5 and an air agitation timer T6 are simultaneously started by a circuit through normally open contacts 380 of switch 119, which switch contacts 380 are closed when the felting die 55 is in its upper transfer position. The pulp timer T5 opens the valve 45 in the line 44 to the system reservoir 40 for feeding a predetermined amount of pulp slurry to the slurry tank 46 during the predetermined timing period of the timer T5. The timer T6 completes a circuit to a solenoid 381 for opening a valve 382 to force compressed air through the tubes 116 to agitate the pulp slurry during and after the operation of the slurry feed valve 45. The switch 119 also has normally closed contacts 383 in a circuit through the normally closed contacts 315 of switch 302 to the solenoids 316 and 317 for actuating the air cylinders 236 to move the ejection fingers 239 of the left and right female drying dies to an outward or retracted position.

The timer T12 is triggered by a circuit through the switch 301 which is closed by the movement of one of the left or right drawers into position over the preform tank for receiving a preformed article from the transfer die 56. The timer T12 provides a circuit to the solenoid 322 for the transfer die cylinder 127 and also provides parallel circuits through the normally closed contacts 336 and 338 of the switches 307 and 308 to the ejection air solenoids 337 and 339. Accordingly, when the drawers of the left and right male drying dies 57 are in the drying position, the contacts 336 and 338 are open so that the circuits to the ejection air valves 337 and 339 are interrupted, whereas the circuit to one of the ejection air valves will be completed when timer T12 is triggered to lower the transfer die when one of the drying dies 57 is in extended transfer position and the discharge table 59 is positioned below the female drying die 58.

The transfer blow off timer T13 is triggered when timer T12 times out and establishes a circuit to open the compressed air valve 384 for blowing the wet preform from the transfer die 56 onto the male drying die 57. The timer T13 also provides parallel circuits to solenoids 385 and 386 of the vacuum valves 351 and 355 for the left and right male drying dies 57, respectively. The solenoids 385 and 386 open the valves 351 and 355 to establish a vacuum on the drying die for receiving the wet preform from the transfer die 56.

To complete the control circuit for the apparatus 20, main power is connected through a master switch SW1 (shown in "off" position) and movable to "automatic" or "manual" position. The master switch SW1 includes contacts 390 and 391 for automatic operation of the apparatus 20 and contacts 392 and 393 for manual operation. It will be seen that the automatic contacts 390 provide power to each of the timers T1, T2, T3, T4, T7, 8, T9, T10, T11 and T13 as required, and power is also placed on leads to the contacts 360 and 361 of the stepping relay 359, the normally open contacts 357 of the switch 302, the switch 301, the contacts 380 and 383 of the switch 119, the contacts 333 and 330 of the switches 307 and 308, respectively, and to the switches 305 and 306. Both automatic and manual contacts 391 and 393 of the master switch SW1 are connected to the contacts 325 and 326 of the switches 303 and 304 to supply power thereto. The manual contacts 392 are connected to a normally open manual switch SW4 for energizing the solenoid 381 to provide air agitation in the slurry tank 46.

The main power line is also connected directly to a normally open manual switch SW2 for turning on the burners in the male and female drying dies 57 and 58, and a normally open manual switch SW3 is connected in series with the switch SW2 for actuating the valve 45 to feed pulp slurry from the reservoir 40 to the slurry tank 46. Manual switch means (not shown) may also be provided for moving any of the apparatus devices to any operative or inoperative position thereof.

For a full understanding of the invention one complete cycle of the apparatus will now be given.

In starting the equipment the automatic-off-manual switch SW1 is turned to manual, and the manual pulp and heat control switch SW2 is turned to the on position thereof. The manual air button SW4 is then pressed to start agitation in the preform tank 46. The manual air button sends an impulse to a self-locking relay that will maintain power on the solenoid valve 381 supplying air to the preform tank air agitation tubes 116. The power will be removed from this relay immediately upon moving the auto-off manual switch SW1 to either off or manual. Pulp may be added to the preform tank 46 by depressing push button SW3 as long as SW2 is in the on position, and SW2 also supplies power to the heat control pyrometers for the burners of the dies.

The preform hoist and transfer dies 55 and 56 are then positioned with the hoist above the slurry level and the transfer die at the return position. The drawers 57 are always stopped in return or drying position which is underneath the presses 58 so as to permit the male and female molding dies to engage properly.

The cam 319 that operates the limit switch 301 is of the non-return sliding type, and it should be determined on which side of the switch the cam was placed by the last drawer operation. If the cam is on the left side of the switch 301, the stepping or ratchet relay 359 should be stepped by hand so that only contacts 362 are closed. If the cam 319 is on the right side of the switch 301, the contacts 363 should be closed. However, initial operation of the apparatus 20 will have sent the transfer die up to return position to step the relay 359 to close contacts 361 and 363. In identifying the left or right side, the equipment is viewed from the conveyor or discharge side as seen in FIG. 2. The equipment 20 is now ready for automatic operation and, as soon as the dies reach operating temperature, the automatic-off-manual switch SW1 is turned to automatic to begin a continuous molding operation.

*Sequence of Operation*

Immediately upon SW1 being placed in automatic, power is sent to the timers 1, 8 and 10. Timer 1 sends the preform hoist 55 down into the tank 46 to mold a preform. Timer 8 operates the solenoid air valve 379 that supplies compressed air to the back side of the preform die and provides a washing action when the preform die 55 enters the aqueous pulp solution of the preform tank 46. The timer 10 supplies power to the open or up solenoid 372 or 366 of either the left or right press and it will be assumed that the left press 58 has been set to open so that only contacts 362 of the ratchet relay 359 were engaged before the beginning of the operation. Timer 10 is set for a period to provide time for the left press to travel high enough so that the contacts 348 of limit switch 313 are closed, and the left drawer die 57 will move under the transfer die 56.

At the instant the left press 58 began to raise, the vacuum valve 351 was turned off the male drying die by operation of the press control timer T10 through the contacts 363 on the ratchet relay 359 and contacts 348 of the switch 313, and at the same time the left die blow off valve 349 received energy. Simultaneously with the press starting upwardly, the vacuum valve 376 of the left press receives power through the ratchet contacts 363 from the press control timer T10. The air supply to blow a molded piece off the male drying die 57 will be maintained until the left die blow off limit switch 313 has been disengaged from its cam 343. Power is provided at the normally open contacts of left drawer in limit switch 309, but the left press does not engage this switch until fully returned. However, the switch 313 supplies power to the solenoid air valve 236 that will send the left ejector fingers 239 under the female mold in position for a molded piece to be blown down against them. Although power is removed from the solenoid 345 that operates the air valve 236, the fingers remain in position due to the fact that this valve is a double solenoid non-centering type.

When the ram of the female molding press engages the left drawer in limit switch 309, the left drawer immediately begins to move in underneath the transfer mechanism and engages the left drawer safety switch 303. This safety switch 303 performs the dual function of keeping the preform hoist cylinder solenoid 327 energized to hold the felting die 55 down and breaks the circuit to the right drawer solenoid 321. The left drawer then engages the sliding cam 319 and pushes it so as to operate the drawer transfer control limit switch 301. The switch 301 sends an impulse to timer T12 and to a self-lock relay (not shown) for holding voltage on the timer T12. The instant timer T12 begins to run, the transfer mold 56 begins to move down to engage the male drying die 55 on the left drawer 160 and simultaneously the left die ejection air valve 337 receives power from the timer T12 and will blow a molded article A down against the ejection fingers 239. The ejection fingers will stabilize the piece and eliminate any possibility of one corner of a deep part hanging in the female die. As the transfer mold continues to advance downwardly toward the male drying die 57, ratchet relay limit switch 302 is disengaged and power is supplied through normally closed contacts 315 to the left ejector finger out solenoid 316. The fingers 239 are now quickly withdrawn and the ejection air will blow the molded article A onto the discharge plate 59 mounted directly behind the left drawer and positioned below the left molding die 58. The transfer timer T12 is set to move the transfer die to engage the male die on the left drawer, and when this timer times out the transfer die will travel upward and disengage the left drying die. At the instant that the transfer die 56 begins to move away from the left drying die 57, air is injected on the back side of the transfer die by operation of timer T13 triggered by timer T12 so as to help free a preform from the transfer die. Vacuum is placed on the male drying die 55 by the timer T13 energizing the solenoid 385. The left die ejection air valve 337 is also closed when the timer T12 times out.

When the transfer die cam engages the ratchet relay limit switch 302, the contacts 357 are closed to energize the solenoid 358 and step the ratchet relay 359 so that only contacts 363 are now closed and the circuit through contacts 361 to the left drawer cylinder solenoid 320 is opened to return the drawer to its drying position under the left molding die 58.

The instant the drawer returns to its indexed position, the left press close solenoid 328 is energized through the left drawer close press limit switch 305 to lower the left female press to mold an article. Preferably, the cylinder 154 is initially actuated at a rapid speed to bring the molding dies 57 and 58 into juxtaposition and speed up the operation of the apparatus, but means are provided for changing the porting to slow down the press advance speed so that the molding dies will close at a cushioned rate. The cam 343 engages the left die protection air open limit switch 311 to open the left die protection air solenoid 334 and supply low pressure air to the ports 223 of the female die 58 and prohibit fine particles from being deposited in and thus clog the ejection ports. The protection air is turned off the left die at the instant that the right press begins to open when the transfer die 56 has advanced to receive a wet preform and returned to actuate stepping relay 359 to close the contacts 360 and 362 as will now be described.

It has been seen that the cycle delay timer T11 times out to energize timers T1, T8 and T10 to start a preform or felting operation. The vacuum delay and air wash timer T8 times out to send an impulse to vacuum timer T9 so that vacuum is placed on the preform die 55 to draw a preform. When the hoist timer T1 times out it starts the transfer delay timer T2 and the hoist returns to its normal position above the level of the pulp slurry. With the preform above the level of the pulp slurry, air is drawn through the preform for approximately the length of time set on the transfer delay timer T2 which then times out to start transfer timer T3. The instant that timer T3 begins to run the transfer die advances to pick up the preform. After the transfer die 56 has come into contact with the preform die 55, the timer T9 times out and switches the vacuum from the preform die to the transfer die. When the transfer timer T3 times out it sends power to the air felt blow off timer T4 to energize the preform blow off solenoid 377. This will assist the preform to be properly seated in the transfer die 56. The transfer now returns to its normal position and engages the ratchet relay limit switch 302 and this steps the ratchet relay 359 to the proper position (closing contacts 360 and 362) to switch the function of the machine to the right side. The air felt blow off timer T4 sends power to the cycle delay timer T11, which resets the major portion of the timer board. The ratchet relay is now conditioned to open the right press and the sequence of operation previously described will now be repeated for the right side. The machine will continue to operate automatically, alternating between the right and the left press until the master switch SW1 is rotated to either "off" or "manual."

The present method of molding articles from a pulp slurry in one continuous operation comprises the steps of agitating a pulp slurry to obtain a substantially uniform dispersion of fibers in solution, adding pulp slurry in predetermined quantities to maintain a substantially uniform concentration of fibers in solution, suction molding a preform on a mold, applying substantially uniform pressure over the wet preform surface to remove residual moisture, transferring the preform from the preform mold, cleaning the preform mold, simultaneously transferring the preform to a drying die and air cleaning the transfer means, drying the preform under predetermined conditions of heat and pressure to form a molded article, protecting the molding means from steam and fine fiber particles, ejecting the molded article under air pressure for transfer to a subsequent processing station, and simultaneously straightening or stabilizing the molded article in its transfer or flight pattern in response to ejection air pressure.

The foregoing description and accompanying drawings are given only by way of illustration and example, and the present invention includes changes and modifications thereof that will be apparent to those skilled in the art and is limited only by the claims which follow.

What we claim is:

1. An apparatus for molding pulp articles in an automatic continuous operation comprising slurry tank means including laterally disposed felting tank and surge tank portions being in fluid communication through an opening adjacent to the bottoms thereof, said felting tank portion containing pulp slurry, felting die means movable vertically between a lower felting position in said felting tank portion in which an article is molded on said felting die means in a vacuum felting operation and an upper transfer position above the level of said pulp slurry, said surge tank portion accommodating slurry displacement from said felting tank portion when said felting die means moves from said upper transfer position into said felting tank position, transfer means movable vertically between an upper retracted position and a lower transfer position for receiving molded articles from said felting die means, first drying die means movable horizontally between an extended transfer position for receiving articles from said transfer means and a retracted drying position, second drying die means movable vertically between a lower drying position engaged with said first drying die means and an upper ejection position, and discharge means for molded articles and movable horizontally in concert with said first drying die between an extended position underlying said second drying die means in its upper ejection position for receiving articles therefrom and a retracted discharge position.

2. The apparatus according to claim 1 in which said surge tank portion has an upper portion periodically receiving white water removed from said felting tank portion in said vacuum felting operation to thereby maintain a predetermined level of slurry in said felting tank portion, said surge tank portion also having a lower portion communicating with said felting tank portion through said opening, and baffle means extending into said surge tank portion forming a restricted passage between the upper and lower portions thereof for dampening slurry agitation and substantially excluding pulp slurry from the upper portion of said surge tank portion.

3. A system for making pulp articles comprising an apparatus for molding articles in an automatic continuous operation, said apparatus including a felting tank having a fibrous pulp slurry, felting die means movable vertically between a lower felting position in said felting tank and an upper transfer position above the level of said pulp slurry, transfer means movable vertically between an upper retracted position and a lower transfer position, first drying die means movable horizontally between an extended transfer position underlying said transfer means and a retracted drying position, second drying die means movable vertically between a lower drying position and an upper ejection position, means for discharging molded articles and being movable horizontally in concert with said first drying die between an extended position underlying said second drying die means and a retracted discharge position and control means to cause said felting die means, said transfer means, said first drying die means, and said second drying die means to cooperate in molding and ejecting an article automatically, said control means including means to raise said felting die means from said pulp slurry to its transfer position, means to cause said transfer means to contact and squeeze a felted article on said felting die means and to remove said article from said felting die means and transfer it to said first drying die means, means to bring said second drying die means into contact with said article being carried by said first drying die means, and means to felt another article on said felting die means in said pulp slurry while said article is being transferred to and dried by said drying die means.

4. The system according to claim 3 wherein first and second drying dies and discharge means are provided on opposite sides of said felting die and transfer means, and said transfer means controls alternate operation thereof.

5. The system according to claim 3 in which said apparatus includes a plurality of water nozzles carried by said transfer means and adapted to direct jets of water against said felting die means in a sweeping pattern during movement of said transfer means toward retracted position, and high pressure air means being connected to said felting die means after said water jet actuation.

6. An apparatus for molding articles in an automatic continuous operation comprising slurry tank means including laterally disposed felting tank and surge tank portions in open fluid communication through an opening adjacent to the bottoms of said portions, said felting tank portion containing a predetermined amount of fibrous pulp slurry, felting die means vertically reciprocable between a lower felting position within said felting tank portion and an upper transfer position above the level of said pulp slurry, vacuum means for accreting a preform of fibrous pulp on said felting die means in its lower felting position, said vacuum means also drawing air through said preform during movement of said felting die to its upper transfer position, said surge tank portion accommodating slurry displacement from said felting tank portion when said felting die moves from said upper transfer position into said felting tank portion, transfer means vertically reciprocable between an upper retracted position and a lower transfer position in juxtaposition with said felting die means in its upper transfer position, said transfer means being caused to press toward said felting die means in the transfer positions thereof to squeeze said preform and remove residual excess moisture therefrom, first drying die means horizontally reciprocable between an extended transfer position indexed to coincide with the upper transfer position of said felting die means and a retracted drying position, second drying die means vertically reciprocable between a lower drying position in juxtaposition with said first drying die means in its retracted drying position and an upper ejection position, and means for discharging molded articles and being horizontally reciprocable in concert with said first drying die between an extended position underlying said second drying die means when in its upper ejection position and a retracted discharge position, and automatic control means for operating said apparatus including a plurality of interdependent timing means for said felting die, transfer and drying die means.

7. In an apparatus for drying molded fibrous pulp articles under heat and pressure, a first die member adapted to receive a wet preformed article, a second die member movable into engagement with the wet preformed article on said first die member, at least one of said die members being heated to dry said article and thereby generate steam, and air pressure protection means associated with said second die member to dispel generated steam and extrained fibrous fines therefrom during drying engagement.

8. In an apparatus for drying molded fibrous pulp articles under heat and pressure, a first die member adapted to receive a wet preformed article, a second die member movable into engagement with the wet preformed article on said first die member, at least one of said die members being heated to dry said article and thereby generate steam, said second die member having a die cavity with a plurality of spaced ports peripherally arranged therewith, and an air manifold in communication with said spaced ports and adapted to be selectively connected to a low pressure air source during drying operation to apply low pressure air in said spaced ports and exclude steam therefrom and to a vacuum source for removing the dried molded article from the first die member.

9. In an apparatus for drying molded articles under heat and pressure, a first heated drying die member adapted to receive a wet preformed article, a second heated drying die member movable vertically into engagement with the wet preformed article on said first die member, said second die member having a die cavity with a plurality of spaced ports peripherally arranged therewith, and an air manifold in communication with said spaced ports and sequentially connected to a low pressure air source during drying operation to dispel steam from said spaced ports, to a vacuum source for removing the dried molded article from the first die member, and to a high pressure air source for applying high pressure ejection air through said air manifold to said ports for discharging an article downwardly from the die cavity, and article supporting means movable from a retracted position outwardly of said die cavity to an extended position under said die cavity for receiving and stabilizing said article during discharge.

10. The apparatus according to claim 9 in which said first drying die member has a perforated mold body in which vacuum is maintained during the drying operation during the time low air pressure is provided in the ports of said second die member, and means for subjecting said mold body to a high air pressure concurrently with connection of said air manifold to said vacuum source to seat said article in the die cavity of said second die member and to clean said first die member.

11. The apparatus according to claim 9 in which said article supporting means are provided on opposite sides of said second die member, and means for actuating said opposed article supporting means from retracted position to extended position during movement of said second die member away from said first die member at the end of a drying operation.

12. The apparatus according to claim 11 including control means for withdrawing said opposed article supporting means to said retracted position after the high pressure ejection air is applied in said ports and during the time of discharge of the article thereby.

13. The apparatus according to claim 12 wherein said first die member is movable horizontally from its drying position, a discharge table movable in concert with said first die member to an article receiving position beneath said second die member, and said control means being actuated by said discharge table for withdrawing said opposed article supporting means to retracted position when said discharge table is in article receiving position.

14. In an apparatus for drying molded articles, opposed die members relatively vertically movable into juxtaposition with material for an article to be dried therebetween, means for applying opposed pressures on said die members, and ejection means for discharging a dried molded article downwardly from the upper of said die members including opposed pairs of spaced article supporting members carried by said upper die member and adapted to be moved laterally to an extended position below said upper die member, means applying ejection air pressure on a dried molded article in said upper die member to discharge said article onto said opposed article supporting members, and means for withdrawing said opposed article supporting members from beneath said upper die member for releasing said article.

15. In an apparatus for drying molded articles, opposed first and second die members relatively vertically movable into juxtaposition with material for an article to be dried therebetween, said first die member being secured on carriage means yieldably mounted on wheel assemblies and being laterally movable therewith between an article material receiving position and an article drying position beneath said second die member, means for applying pressure on said second die member to seat it against said first die member, and said carriage means being movable against its yieldable mounting on said wheel assemblies under pressure from said second die member and being engaged on a rigid support to which said second die member pressure is transmitted.

16. In an apparatus for drying molded articles, opposed die members relatively vertically movable into juxtaposition with material for an article to be dried therebetween, means for applying pressure on one of said die members to seat it against the other die member, and said other die member being carried on wheel assemblies and being biased upwardly therefrom by spring means, said other die member being freely movable on said wheel assemblies between a horizontally extended position for receiving material to be dried and a retracted position indexed below said one die member and over a rigid supporting frame, and said other die member being yieldably movable against the force of said spring means by pressure exerted thereon by said one die member and having rigid carriage means engaged on said supporting frame to transmit the pressure thereto.

17. In an apparatus of the type described, a die member movable in a horizontal path between extended and retracted indexed positions, first indexing means for adjustably locating said die member in said extended position, second indexing means for adjustably locating said die member in said retracted position, said die member being movable by cylinder means having a piston rod, and said first indexing means including first and second frame members on said die member having openings coaxially aligned with said piston rod and having opposed surfaces, a bushing threaded on the piston rod and extending through said openings with a predetermined clearance, said bushing having a flange abutting said opposed surfaces of said die member, and means for effecting relative rotation between said piston rod and bushing to adjust the die member axially of said piston rod.

18. In an apparatus of the type described, a die member movable in a horizontal path between an indexed extended transfer position and an indexed retracted drying position over a rigid frame, first indexing means for adjustably locating said die member in said extended transfer position, second indexing means for adjustably locating said die member in said retracted drying position, said die member being secured on a carriage yieldably mounted on wheel assemblies for movement between said positions by cylinder means having a piston rod, said carriage having spaced frame members with openings coaxially aligned with said piston rod and with opposed surfaces, and said first indexing means including a bushing threaded on the piston rod and extending through the openings with a predetermined clearance and having a flange abutting said opposed surfaces, and means for effecting relative rotation between said piston rod and bushing to adjust the relative axial position of said carriage on said piston rod, and said second indexing means including a stop member adjustably secured on said rigid frame and adapted to be contacted by said carriage in less than a full return stroke of said piston rod.

19. The apparatus according to claim 18 wherein said piston rod is slidably received through a rigid member secured to said rigid frame immediately adjacent to said cylinder, and other die means movable vertically into drying engagement with said die member and moving said carriage against its yieldable mounting on said wheel assemblies into pressure transmitting engagement with said rigid frame, and said piston rod being supported against bending by said rigid member and causing said bushing to move laterally in the openings of said spaced frame members of said die member.

References Cited in the file of this patent

UNITED STATES PATENTS

| | | |
|---|---|---|
| 463,160 | Moore et al. | Nov. 17, 1891 |
| 1,242,365 | Nall | Oct. 9, 1917 |
| 1,882,937 | Root | Oct. 18, 1932 |
| 2,006,831 | Hawley | July 2, 1935 |
| 2,045,163 | Raffles | June 23, 1936 |
| 2,070,040 | Chapman | Feb. 9, 1937 |
| 2,354,007 | Goldsmith | July 18, 1944 |
| 2,494,743 | Chaplin | Jan. 17, 1950 |
| 2,640,402 | Comstock | June 2, 1953 |
| 2,705,442 | Kyle et al. | Apr. 5, 1955 |
| 2,752,829 | Turner | July 3, 1956 |
| 2,929,105 | Starck et al. | Mar. 22, 1960 |
| 2,961,042 | Wolter | Nov. 22, 1960 |
| 2,969,835 | Young | Jan. 31, 1961 |

FOREIGN PATENTS

| | | |
|---|---|---|
| 541,224 | Great Britain | Nov. 18, 1941 |